(12) United States Patent
Gogo et al.

(10) Patent No.: US 6,182,994 B1
(45) Date of Patent: Feb. 6, 2001

(54) REAR SWING ARM OF MOTOR-BIKE WITH TAPERED RECTANGULAR PIPE MEMBER AND METHOD OF MANUFACTURING TAPERED RECTANGULAR PIPE FOR VEHICLE BODY

(75) Inventors: Kazuhiko Gogo; Tomoo Oka, both of Saitama (JP)

(73) Assignee: Honda Giken Kogyo Kabushiki Kaisha (JP)

( * ) Notice: Under 35 U.S.C. 154(b), the term of this patent shall be extended for 0 days.

(21) Appl. No.: 08/719,444

(22) Filed: Sep. 25, 1996

(30) Foreign Application Priority Data

Sep. 25, 1995 (JP) .................................................. 7-246350
Mar. 19, 1996 (JP) .................................................. 8-063531
Jun. 11, 1996 (JP) .................................................. 8-149369

(51) Int. Cl.⁷ .................................................. B62K 25/26
(52) U.S. Cl. .................... 280/284; 180/227; 280/281.1; 280/288
(58) Field of Search .................... 280/284, 288, 280/281.1, 274; 180/227

(56) References Cited

U.S. PATENT DOCUMENTS

| | | | |
|---|---|---|---|
| 4,523,659 | * 6/1985 | Yamamoto et al. | 280/284 |
| 4,540,193 | * 9/1985 | Noda et al. | 280/284 |
| 4,742,884 | * 5/1988 | Ishikawa | 180/219 |
| 4,746,136 | * 5/1988 | Kirk | 280/281.1 |
| 4,805,716 | * 2/1989 | Tsunoda et al. | 180/219 |
| 5,071,961 | * 12/1991 | Huppe | 280/278 |
| 5,072,961 | * 12/1991 | Huppe | 280/278 |
| 5,249,818 | * 10/1993 | Patterson | 280/281.1 |
| 5,255,932 | * 10/1993 | Moore | 280/281.1 |
| 5,452,911 | * 9/1995 | Klein et al. | 280/288 |
| 5,531,289 | * 7/1996 | Muramatsu | 180/227 |

FOREIGN PATENT DOCUMENTS

| | | | |
|---|---|---|---|
| 4217058 | * 11/1993 | (DE) | 280/284 |
| 2-286488 | 11/1990 | (JP) . | |
| 2-286489 | 11/1990 | (JP) . | |
| 0164390 | * 7/1991 | (JP) | 280/284 |

* cited by examiner

*Primary Examiner*—Anne Marie Boehler
(74) *Attorney, Agent, or Firm*—Birch, Stewart, Kolasch & Birch, LLP

(57) ABSTRACT

A tapered rectangular pipe is formed into the rectangular raw pipe by an extrusion forming under any optional irregular thickness condition in a first step. Then the rectangular raw pipe is reduced to form a tapered part to make a tapered, irregular thickness, rectangular pipe member in a second step.

8 Claims, 23 Drawing Sheets

FIG. 13A
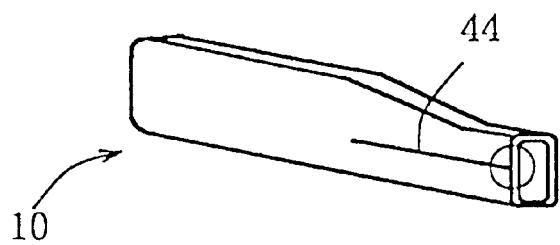
FIG. 13C
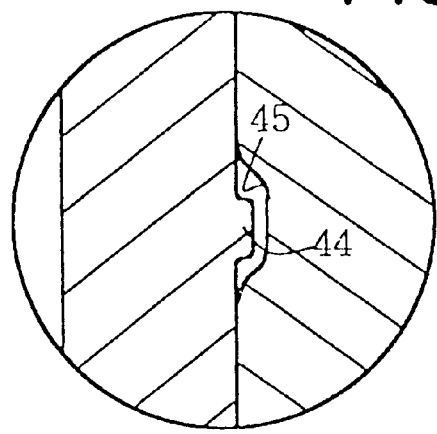
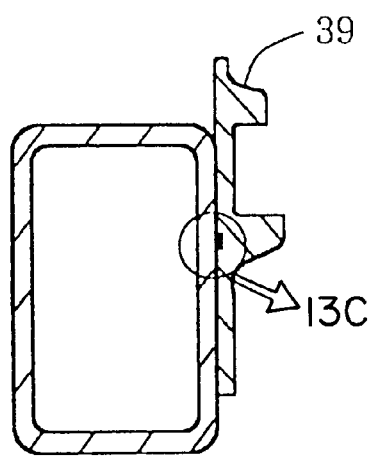
FIG. 13B

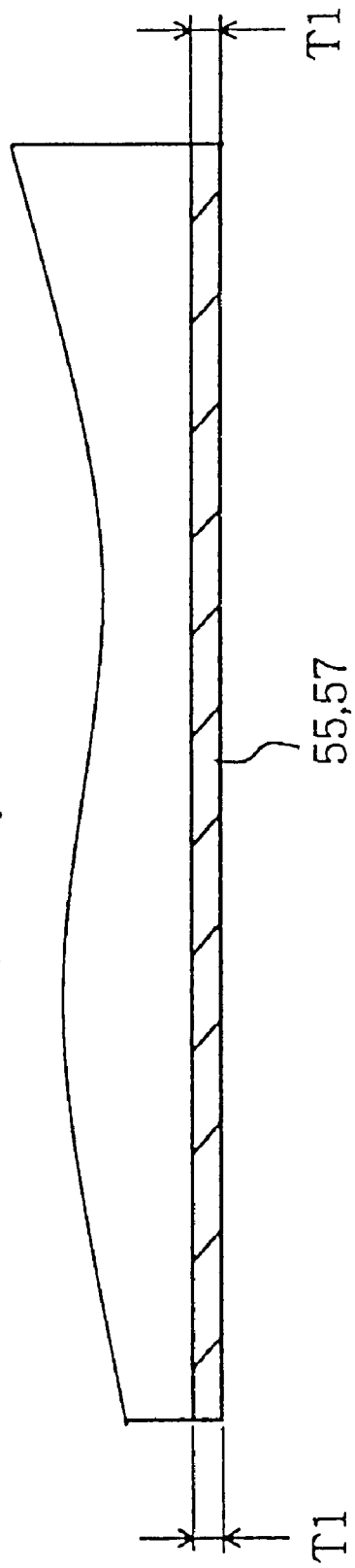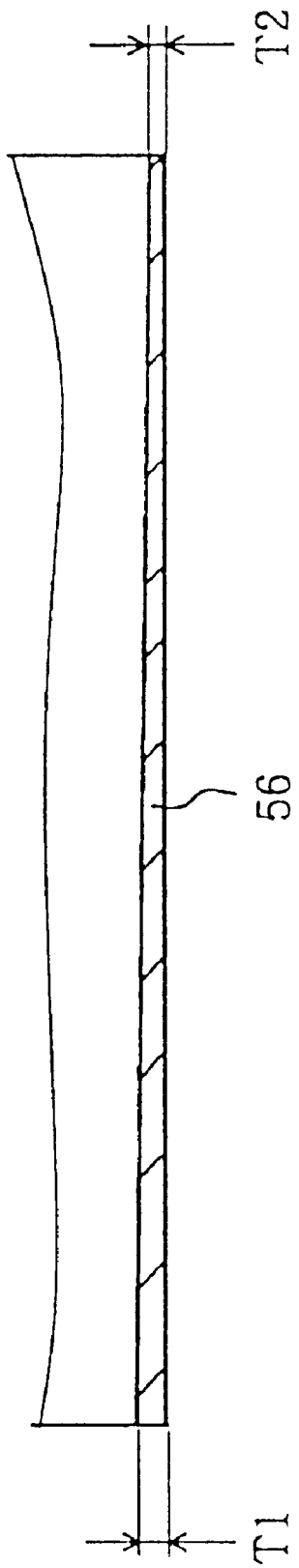

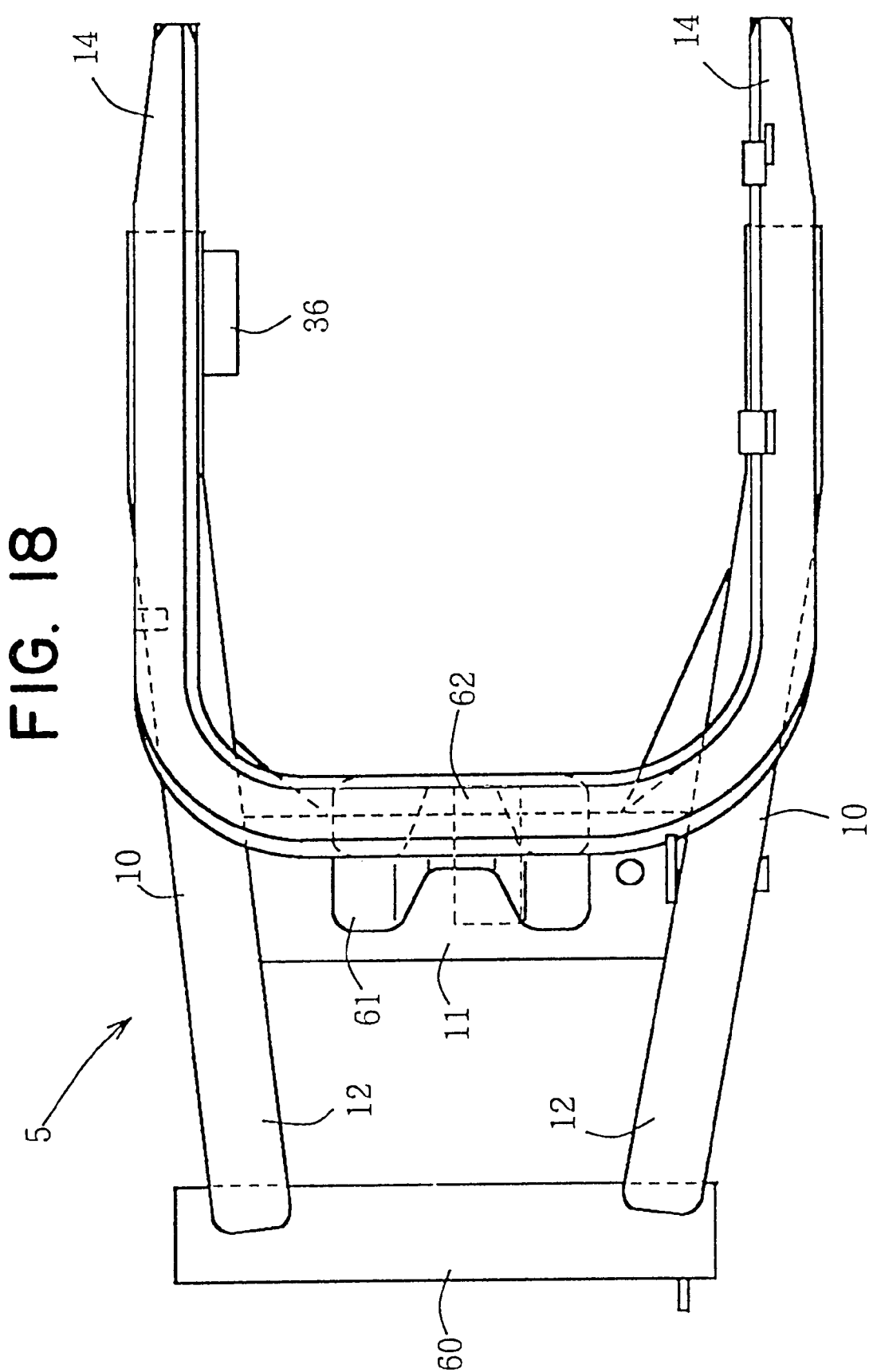

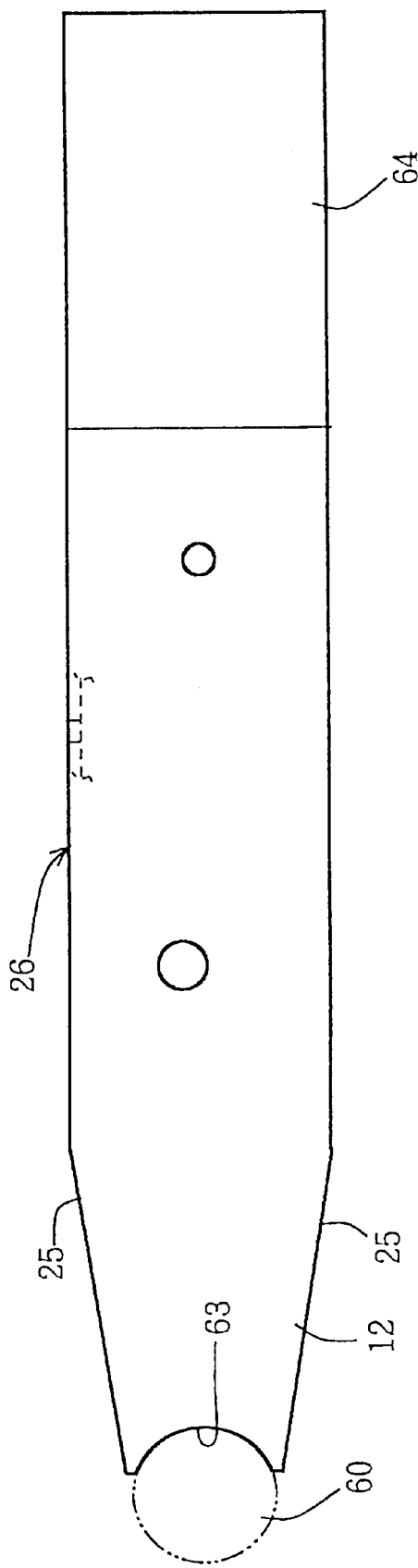
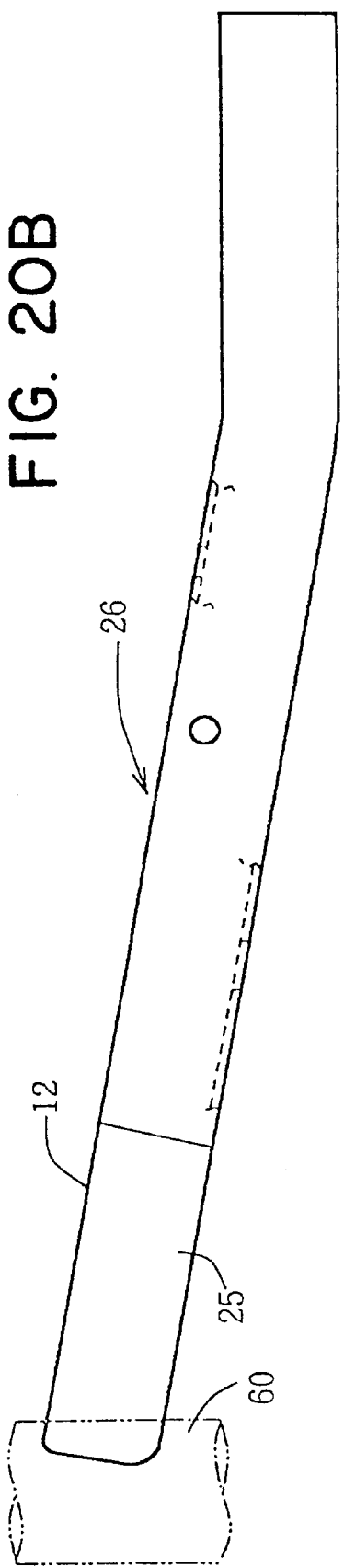

REAR SWING ARM OF MOTOR-BIKE WITH TAPERED RECTANGULAR PIPE MEMBER AND METHOD OF MANUFACTURING TAPERED RECTANGULAR PIPE FOR VEHICLE BODY

FIELD OF THE INVENTION

This invention relates to a rear swing arm for a motor-bike using a tapered rectangular pipe member and a method for manufacturing this tapered rectangular pipe member.

BACKGROUND OF THE PRIOR ART

As the rear swing arm for a motor-bike, a tapered pipe having a longitudinal rectangular sectional surface has been used. As one example of this manufacturing method, there are methods disclosed in Japanese Patent Laid-open Nos. Hei 2-286488 and 2-286489.

These methods are operated such that at first a round raw pipe is formed. The raw pipe is then formed into a tapered pipe in a rotary swagging step where some dies are rotated around the raw pipe to crush it and then lastly form the pipe into a rectangular sectional shape by a bulging step or a compression forming step.

In view of the foregoing, the aforesaid prior art examples require a total number of two steps in the rotary swagging step and the subsequent bulging step or compression forming step in order to obtain the rectangular pipe from the round raw pipe. Accordingly, the number of steps is increased.

In addition, due to application of the rotary swagging step, a degree of freedom of the shape is reduced by the facts that the taper has an axial symmetrical formation and an arcuate (an angle R) shape at the corner part of the rectangular pipe which results in certain restrictions.

In addition to this fact, although each of the wall parts within a longitudinal sectional surface shows a certain variation in wall thickness, each of the walls within the cross-sectional surface, i.e. a sectional surface crossing at a right angle with a longitudinal direction has a uniform wall thickness. Accordingly, it is not possible to optionally set a wall thickness at each of the wall parts within the cross-sectional surface and to efficiently assure a section modulus.

In addition, since an application of load in the rear swing arm of a motor-bike is different in each of the upper, lower, rightward or leftward directions, respectively, it is desirable to form the swing arm with irregular wall thicknessed in which each of the upper, lower, rightward or leftward directions in the cross-sectional surface of the pipe member has a different wall thickness, respectively. However, such an irregular thickness wall formation is impossible in the aforesaid prior art forming method. In addition, it is desired to have a large ground clearance or a long suspension stroke with the rear swing arm.

SUMMARY OF THE INVENTION

It is an object of the present invention to realize the above-noted requirements. In discussing the present invention, the upper, lower, right and left sides of the pipe member will be defined such that a longitudinal direction of the cross-sectional surface is in a vertical direction and a direction crossing at a right angle with the longitudinal direction is expressed as a lateral direction. In addition, a front side is defined as an advancing direction of a vehicle body when it is used as a rear swing arm of the motor-bike.

In order to solve the aforesaid problems, the rear swing arm for a motor-bike of the present invention is constructed of a rectangular pipe which is pivotally supported at its front end to a vehicle body. The rear end of the rectangular pipe supports a rear wheel at a rear wheel supporting part. The rear end of the rectangular pipe is tapered at least partially in a longitudinal direction. The tapered rectangular pipe has sectional surfaces taken perpendicular to a longitudinal direction and has a longitudinal rectangular shape. At least a partial wall surface of at least one of an upper, lower, left-side and right-side walls of the rectangular pipe being thicker than the other walls. One of the longitudinal end parts is made thinner than that of the other end part.

At this time, a lower end of the tapered rectangular pipe can be made straight and an upper end part can be made as a tapered one. In addition, the upper end rear side of the tapered rectangular pipe is made thin to form the rear wheel supporting part and concurrently a brake caliper can be installed above this thin part.

In addition, it is also possible to arrange the tapered part to be narrowed toward a front end of the rectangular pipe and to fix a bearing member connected to the vehicle body to the extremity end of the tapered part.

In addition, in the case that some burrs are found at the surface of the tapered rectangular pipe and concurrently a separate component part is fixed to the surface, it is also possible to form a releasing concave part at a part overlapping the burrs of the separate component part.

As a method for manufacturing a tapered rectangular pipe for a vehicle which is preferable for a rear swing arm of a motor-bike, two steps can be involved. A first step involves extruding a rectangular raw pipe having a rectangular sectional surface and a second step involves forming at least a partial wall surface of the rectangular raw pipe into a tapered shape in a longitudinal direction.

A taper formation in this method can be carried out by a non-rotating swagging step. The non-rotating swagging process is a forming process for swagging without rotating the dies.

In addition, in the first step, the rectangular raw pipe can be formed under an optional irregular wall thickness condition in which at least a partial wall surface is made thicker than that of the other wall in each of the upper, lower, right and left walls in the longitudinal rectangular section.

In this case, it is possible that the upper and lower walls are made thicker than those of the right and left walls or their thick walls are of an integral rib extending in a longitudinal direction at either the inner wall or the outer wall.

In the first step, it is also possible that an inner space of the rectangular raw pipe is divided into a plurality of segments by an integral partition wall extending in a longitudinal direction.

At this time, in the second step, a side wall of a chamber having no wall surface formed into a tapered shape of each of the chambers defined into a plurality of segments by a partition wall is made thinner than a side wall of a chamber having a taper formed wall surface.

A rear swing arm for a motor-bike constructed by a tapered rectangular pipe member of the present invention is characterized in that said tapered rectangular pipe has a longitudinal rectangular sectional shape and at least a partial wall surface of each of upper, lower, left-side and right-side walls is set to have a thicker irregular thickness than that of other walls and either one of the longitudinal end parts is made thinner than that of the other end.

In this way, it is possible to manufacture a light weight and less-expensive rear swing arm of a motor-bike constructed by the tapered rectangular pipe having the most-suitable load distribution.

At this time, when the lower end of the tapered rectangular pipe is made substantially straight and its upper end is tapered, a position of the suspension link can be set at a higher level than the ground, resulting in an increased ground clearance.

In addition, when the upper end rear part of the tapered rectangular pipe is made thin to form a rear wheel supporting part and a brake caliper is installed above the fine part, arrangement of the brake caliper can be set low and a stroke of the rear suspension can be increased only at that portion, making it possible to eliminate an undesirable decrease in capacity of the muffler thereabove.

If the tapered part is arranged at the front end of the rectangular pipe and is made to be narrow toward a front side and a bearing connected to the vehicle body is fixed to the extremity end of the tapered part, the fixing of the bearing member may be facilitated under utilization of the tapered part.

In addition, in the case that the surface of the tapered rectangular pipe has some burrs and a separate component element is fixed to the surface, forming of the releasing recess at a part overlapping on the burrs of the separate component element enables this separate component element to be accurately fixed by burrs without being floated up from the fixing surface. Further, a burr removing action for the burrs generated when the tapered formation is carried out can be reduced.

A method of manufacturing a tapered rectangular pipe for a vehicle of the present invention is comprised of a first step for extruding a rectangular raw pipe having a rectangular sectional surface and a second step for forming at least a partial wall surface of the rectangular raw pipe into a tapered shape in a longitudinal direction.

Due to this fact, since the bulging step or the compressive forming step can be eliminated, the number of forming steps can be reduced and a cost reduction can be attained. Further, since the tapered part can be made non-symmetrical and a corner angle R of the rectangular pipe can be set in a relatively free manner, a degree of freedom of a shape of the fork arm is increased and this material becomes the most suitable one as a vehicle member.

In addition, in the first step, if the rectangular raw pipe is constructed such that at least a partial wall part is formed under an optional irregular thickness wall condition in which it is made thicker than that of the other wall of each of the upper, lower, right and left walls in a longitudinal rectangular section, a wall thickness can be varied for each of the upper, lower, right and left walls to assure an efficient modulus of section well.

If this irregular wall thickness condition is set such that the upper and lower walls are thicker than that of the right and left walls, the present invention can be set to the most suitable one for a pipe member for a vehicle such as a rear swing arm in which a loading action in a vertical direction becomes more than that in the lateral direction.

In addition, if the thick wall part is set to be an integral rib extending in a longitudinal direction to either the inner wall surface or the outer wall surface, it is possible to increase a rigidity of an entire pipe member by a reinforcing structure of the rib.

In addition, in the first step, if the inner space of the rectangular raw pipe is divided into a plurality of segments with an integral partition wall extending in a longitudinal direction, any optional sectional shape such as double-blocks or three-blocks or the like for increasing rigidity of the entire pipe member can be employed.

At this time, in the second step, if the side wall of a chamber having no tapered wall surface of each of the chambers defined into a plurality of segments by the partition walls is made thinner than that of the side wall of the chamber having the tapered wall, it is possible to correct unevenness of the wall extension during formation of the taper, so that occurrence of cracks as the taper formation is performed can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13A is a perspective view showing a fork arm to explain a burr removing treatment;

FIG. 13B is a cross-sectional view showing aa bracket holder overlapping on a burr on the fork arm;

FIG. 13C is an enlarged, cross-sectional view taken in the encircled area of FIG. 13B;

FIG. 17A is a sectional view taken along line 17A—17A of FIG. 15;

FIG. 17B is a sectional view taken along line 17B—17B of FIG. 15;

FIG. 18 is a top, plan view showing a rear swing arm of a fourth preferred embodiment;

FIG. 20A is a side elevational view showing the pipe member;

FIG. 20B is a top, plan view showing the pipe member of FIG. 20A;

DETAILED DESCRIPTION OF THE PREFERRED EMBODIMENTS

Figure 3:
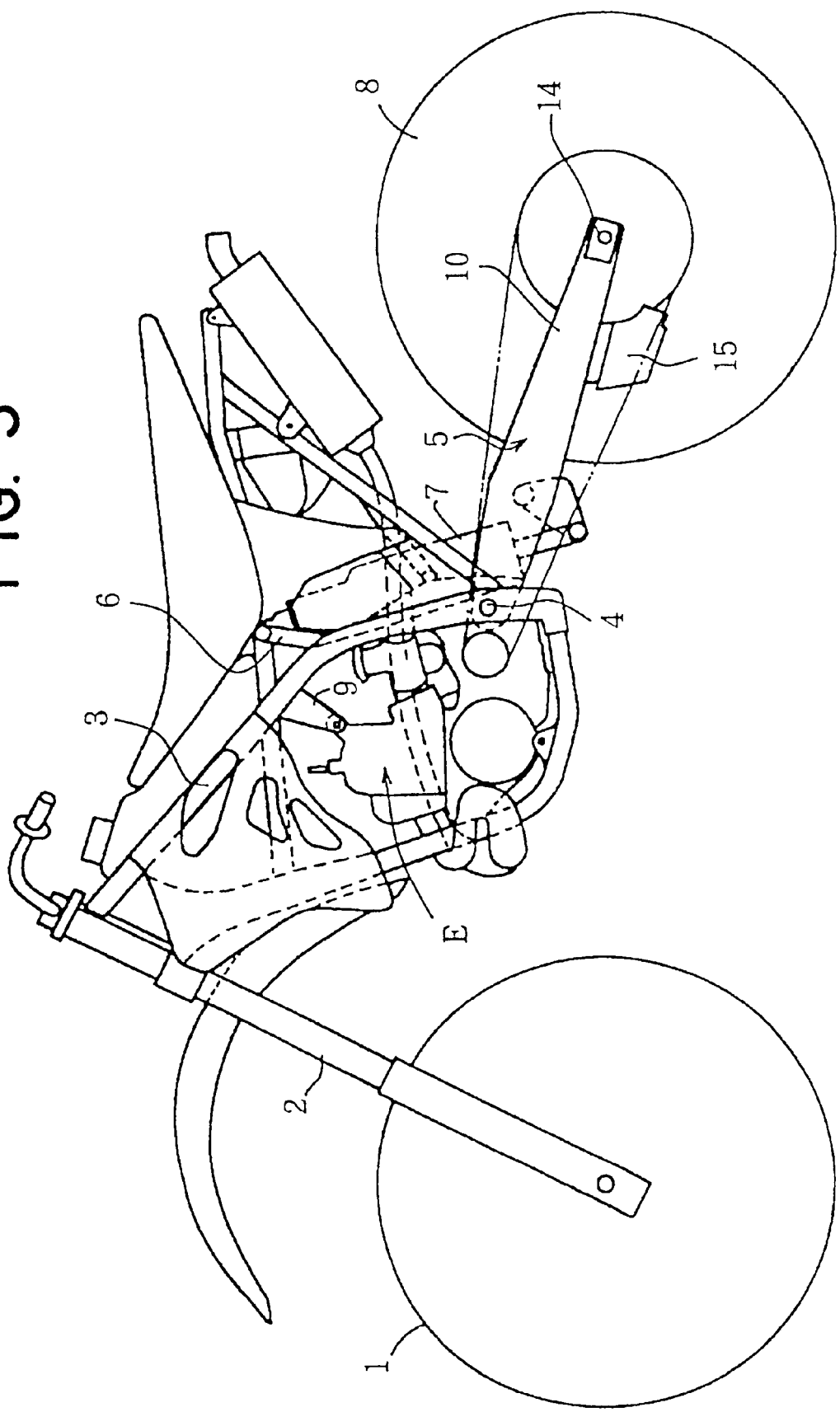
FIG. 3 is a side, elevational view showing a motor-bike.

The method for manufacturing the rear swing arm of a motor-bike will be described as follows. FIG. 3 shows an outer appearance of the motor-bike. An upper end of a front fork 2 supports a front wheel 1 at its lower end. The front fork 2 is supported at the front end of the main frame 3.

To the rear end of the main frame 3, the front end of the rear swing arm 5 is supported by a pivot 4 in such a manner that it may be oscillated in a vertical direction. A rear cushion 7 is fixed between the rear swing arm 5 and a stay 6 extending from the main frame 3. At the rear end of the rear swing arm 5, a rear wheel 8 is supported. In addition, an engine E is supported by an engine hanger 9 extending from the main frame 3 in a downward direction.

Figure 4:
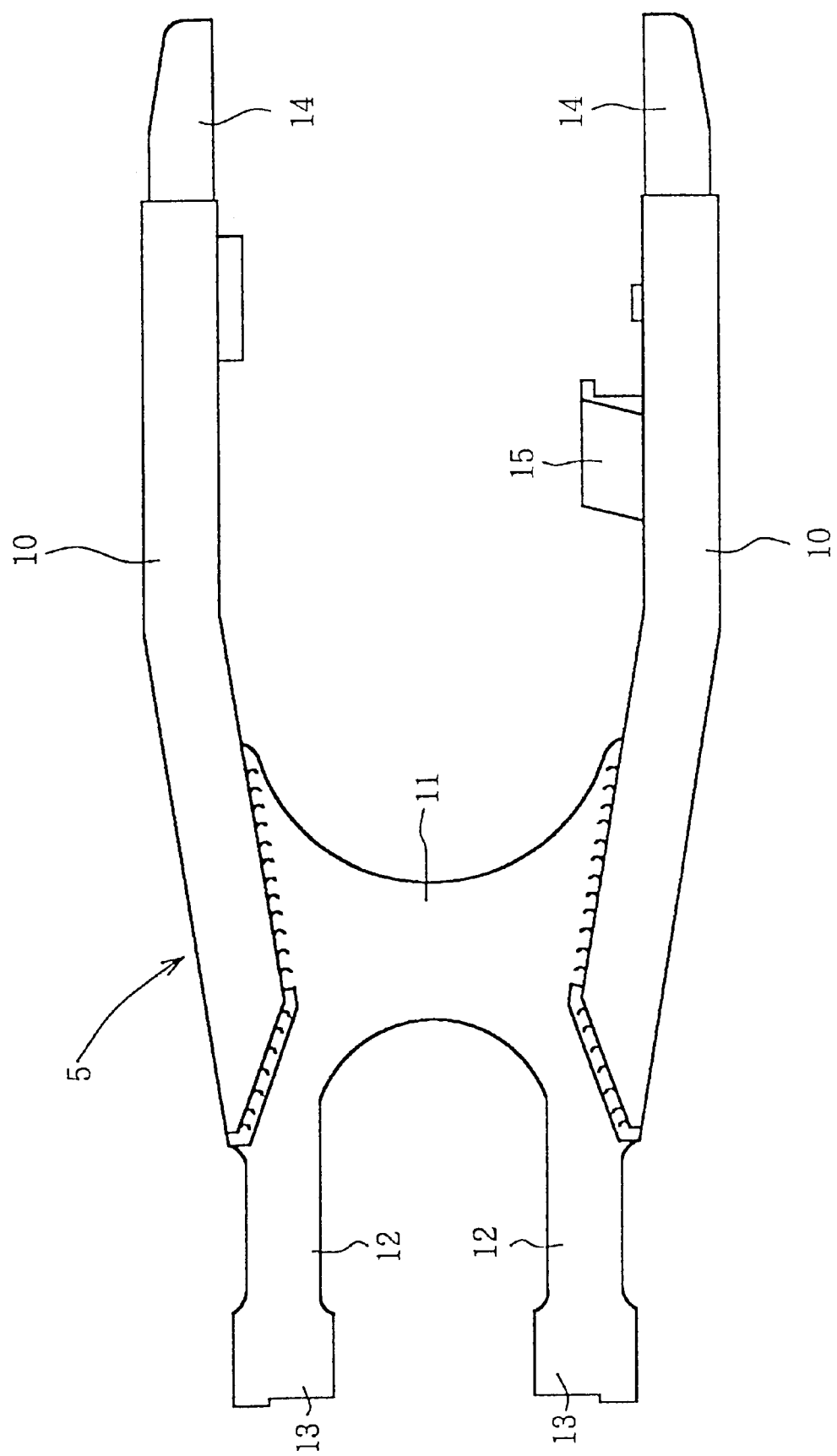
FIG. 4 is a top, plan view showing a rear swing arm.
Figure 5:
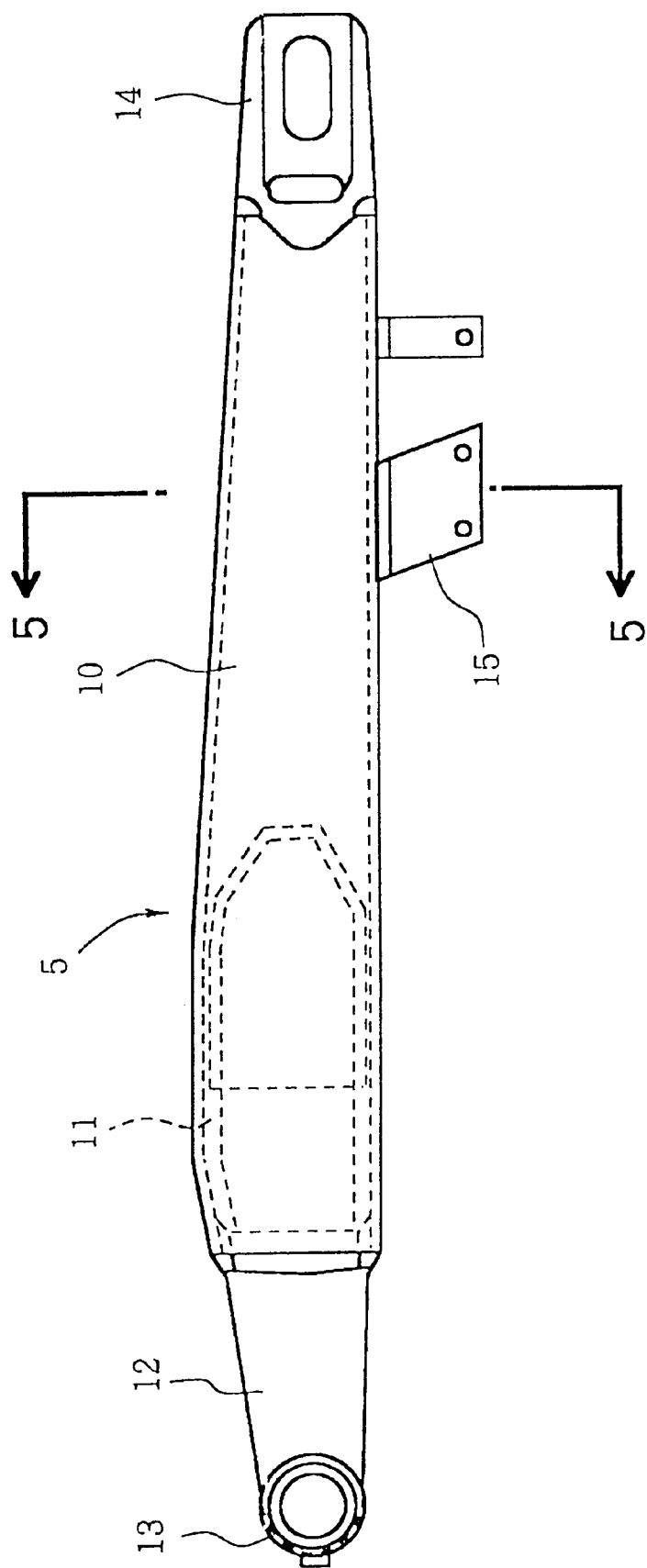
FIG. 5 is a side, elevational view of a rear swing arm.

FIG. 4 is a top, plan view showing the rear swing arm 5 and FIG. 5 is a side elevational view thereof. As shown in these figures, the rear swing arm 5 is comprised of a pair of right and left fork arms 10, a cross member 11 for connecting each of the right and left ends, a pair of right and left bearing arms 12 projecting forwardly and bearings 13 arranged at the front ends of the bearing arms. The bearings 13 support a pivot shaft arranged between the right and left main frames. In addition, at the rear ends of the fork arms 10, welded end pieces 14 support the wheel shaft of the rear wheel 8. A chain guide stay 15 is welded to and fixed to one fork arm 10 near its front end.

Figure 6:
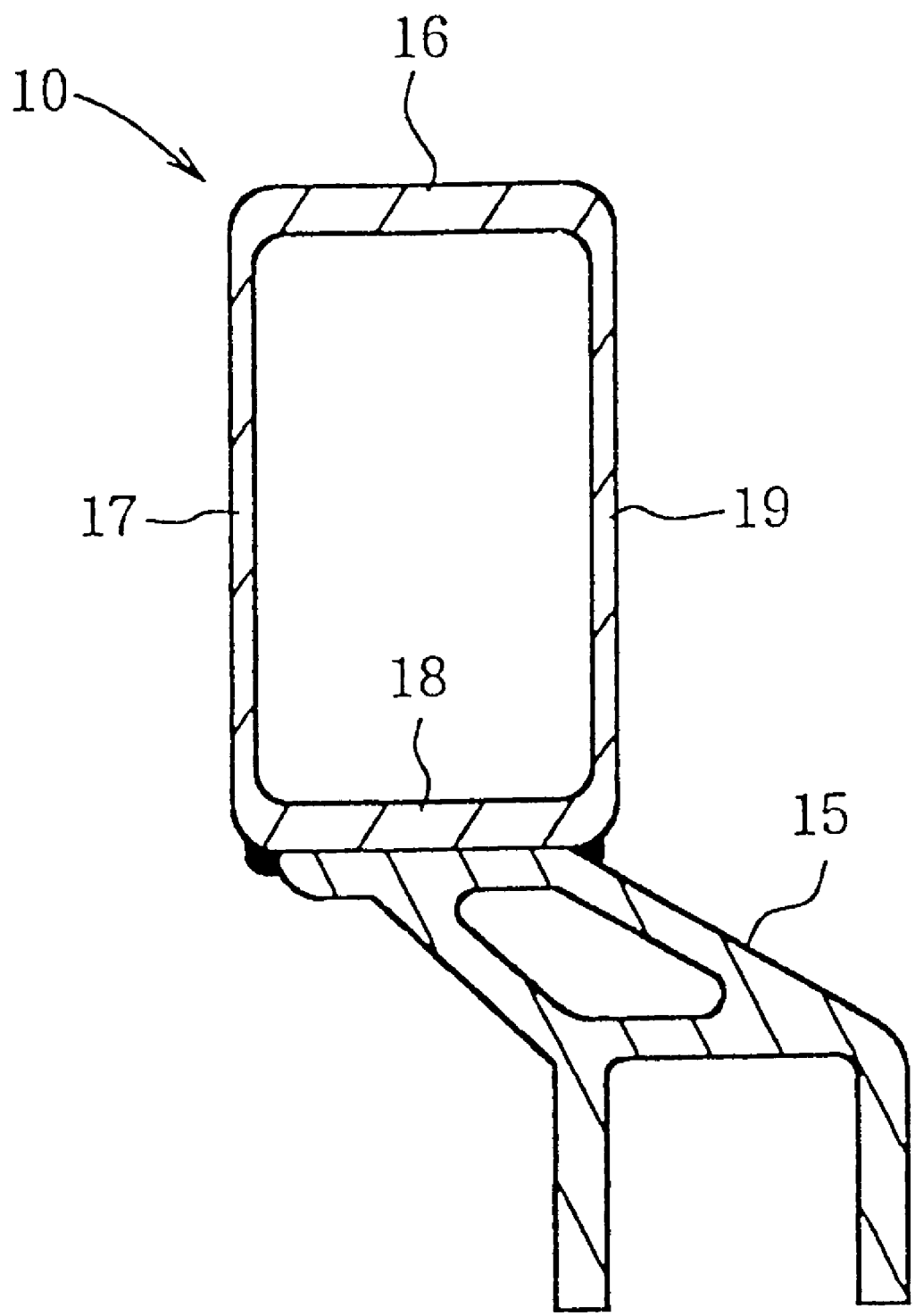
FIG. 6 is a sectional view taken along line 5—5 of FIG. 5.

As apparent from FIG. 5, the fork arm 10 is tapered to be gradually narrowed toward a rear end thereof. As shown in FIG. 6, the fork arm 10 has a rectangular sectional surface in longitudinal cross-section. The fork arm 10 is made of an appropriate metal, such as aluminum alloy or iron or the like. The upper wall 16 and lower wall 18 of the fork arm 10 are made to have an irregular wall thickness which is thicker than that of the left wall 17 and the right wall 19.

In this way, a preferred sectional modulus for the fork arm 10 can be obtained. That is, since a high load is applied to the fork arm 10 from the rear wheel 8 in a vertical direction, it is possible to efficiently increase a modulus of section by making a wall thickness of each of the upper wall 16 and the lower wall 18 thick.

Figure 1:
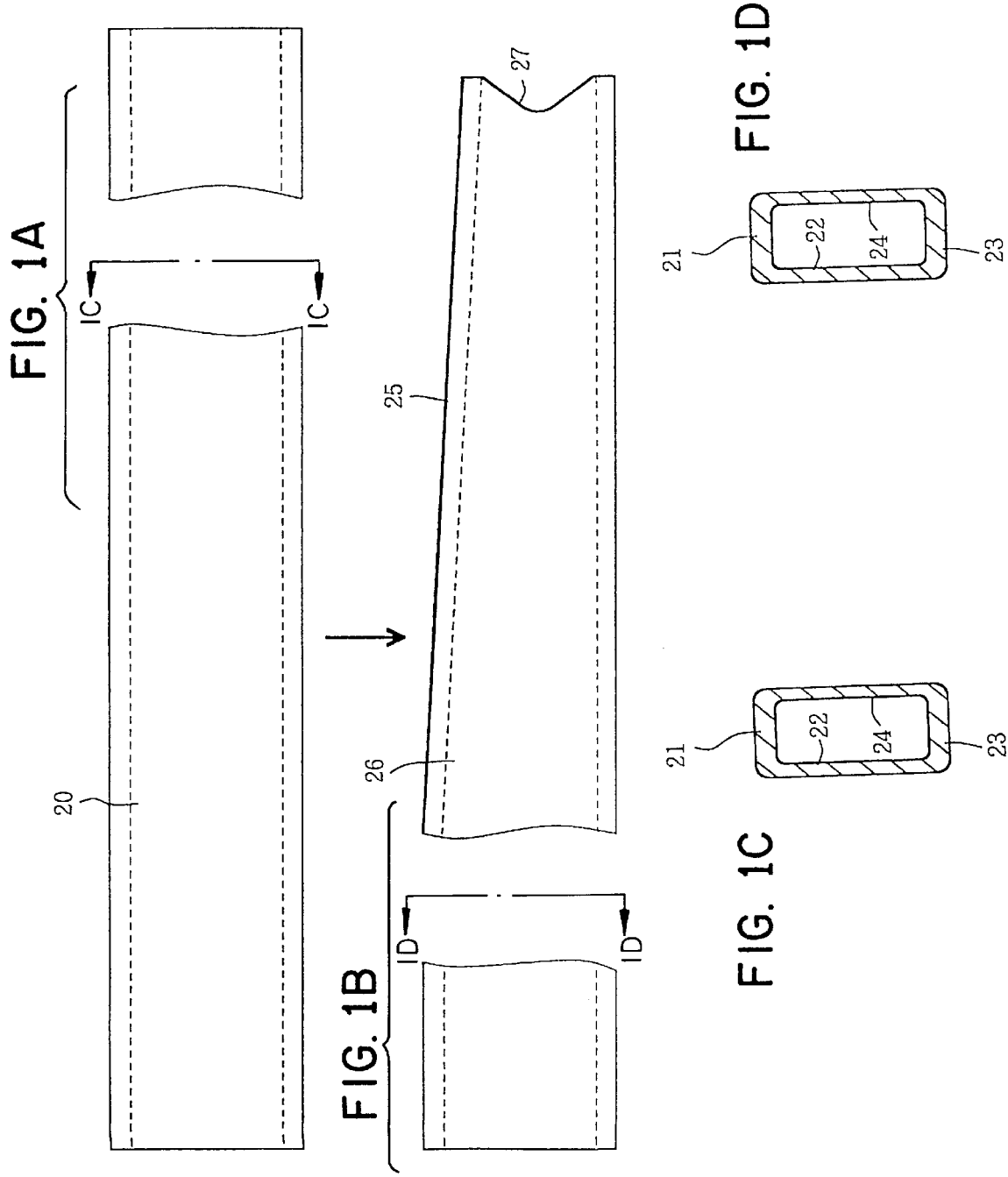
FIG. 1A is a broken, side, elevational view showing a rectangular raw pipe.
FIG. 1B is a broken, side elevational view showing a tapered rectangular pipe member having an irregular thickness.
FIG. 1C is a sectional view taken along line 1C—1C of FIG. 1A.
FIG. 1D is a sectional view taken along line 1D—1D of FIG. 1B.

FIGS. 1A–1D and 2 are views for illustrating a method for manufacturing the fork arm 10. In FIG. 1A, the first manufacturing step is shown. A suitable metal material such as aluminum alloy or iron or the like is hot extruded or cold extruded to from the rectangular raw pipe 20 having a longitudinal section. If a longitudinal direction in the cross-sectional view is set to be a vertical direction, the extruding dies are set such that the upper wall 21 and the lower wall 23 may have a thicker wall than that of the left wall 22 and the right wall 24 as shown in FIG. 1C.

However, it is also possible to make each of the upper, lower, right, and left walls with a different wall thickness from each other without making the wall thickness of each of the upper, lower, right and left walls equal to each other as shown in the figures. That is, the irregular thickness wall can be freely formed by the extrusion forming process. In addition, it is natural to say that the wall thickness of the sectional surface in a longitudinal direction may become uniform.

Figure 2:
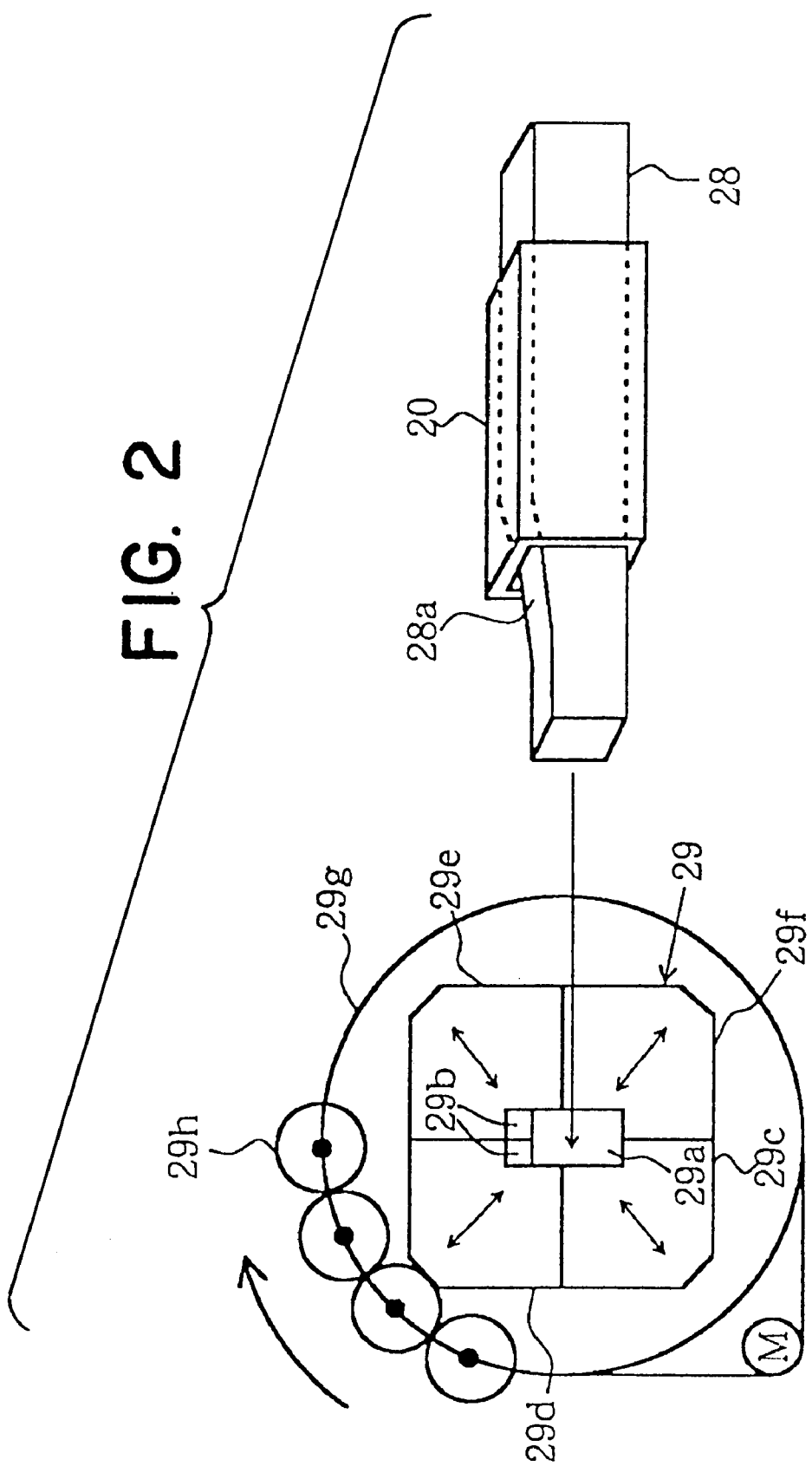
FIG. 2 shows a second manufacturing step.

FIG. 2 is a view for showing the second step of the present method. The step in which the rectangular raw pipe 20 is obtained by the first step is shown. This raw pipe 20 is gradually drawn into a narrow width toward one end by the non-rotating swagging step without rotating dies 29. At first, a core die 28 having a tapered part 28a formed at one end is inserted into a forming space 29a formed in the central part of the dies 29. The inner wall surface of the upper part of the forming space 29a is set to be a tapered surface 29b corresponding to the tapered part 28a.

The dies 29 are made such that their sectional surfaces in a direction crossing at a right angle with an inserting direction of the rectangular raw pipe 20 is substantially a square shape. The dies 29 are formed by four-divided pressing dies 29c to 29f and each die forms a substantial square shape and is movable in an orthogonal direction. A rotating housing 29g enclosing the dies 29 in a circular form is arranged outside the dies 29. A plurality of pressing rollers 29h (only a part of them being shown in FIG. 2) are rotatably arranged in an equally spaced-apart relation around an entire circumference of the circular wall surface of the housing 29g. The pressing rollers 29h may or may not be in contact with the outer corner part of each of the dies 29c to 29f during rotation of the housing 29g. This housing is driven by a motor M.

The rotating housing 29g is rotated and concurrently, the rectangular raw pipe 20 is inserted into a clearance between the dies 29 and the core mold 28 to cause one end of the rectangular raw pipe 20 to be tapered. When this member is removed from the dies 29, the tapered, irregular thickness, rectangular pipe member 26 is obtained.

This tapered, irregular thickness, rectangular pipe member 26 keeps the same irregular thickness condition as that of the rectangular raw pipe 20 in its cross-sectional surface as indicated in FIG. 1D. In addition, in the axial sectional surface, it is also possible to change the axial sectional surface in such a manner that its narrowing part may be gradually thickened in its thickness.

The tapered, irregular thickness, rectangular pipe member 26 shown in FIG. 1B obtained in this way is aged at a suitable temperature for an appropriate period of time and processed by a heat treatment (T6) so as to obtain a certain strength. Thereafter, its rear end is cut to provide a pipe member 26 of a required length. The rear end is provided with a slit 27 for use in fixing the end piece 14. The pipe member 26 is bent and its end is worked on whereafter the cross member 11, the end piece 14 and the chain guide stay 15 and the like are welded to provide the rear swing arm 5.

As described above, according to the present invention, the tapered rectangular pipe member 26 can be formed with an optional irregular thickness condition. In addition, in this example, since the tapered part 25 is formed only along the upper wall 21, shapes of the upper wall 21 and the lower wall 23 may become non-symmetrical with respect to a longitudinal central line of the tapered, irregular thickness, rectangular pipe member 26. Of course, it is also possible to make the member 26 symmetrical with respect to the longitudinal central line.

Accordingly, it is possible to efficiently assure a modulus of section by varying the wall thickness for every wall of the upper, lower, right and left walls. The shape of the member 26 can be made non-symmetrical and a setting of the corner angle R can be freely performed, resulting in increased freedom in forming the shape of the member to be the most suitable shape for the vehicle.

As the width of the member becomes narrow at the tapered part 25, it is possible to gradually decrease the inner corner angle R. The reduced width of the member causes biting of the material during a swagging operation to be restricted, resulting in that a superior flow. This member enables a similar effect to be attained even if the outer corner angle R is changed.

Additionally, since a total number of two steps are required for forming the member and either the bulge working step or the compressive forming step can be reduced when compared to the aforesaid prior art method, the number of forming steps can be reduced and a cost reduction can also be attained.

Further, in accordance with the present invention, even so-called double-blocks or three blocks sectional surface can be obtained. Such surfaces were impossible with the prior art methods. A cylinder is tapered by rotary swagging and thereafter formed into a rectangular shape to have a tapered shape by dividing the intermediate dies.

Figure 7:
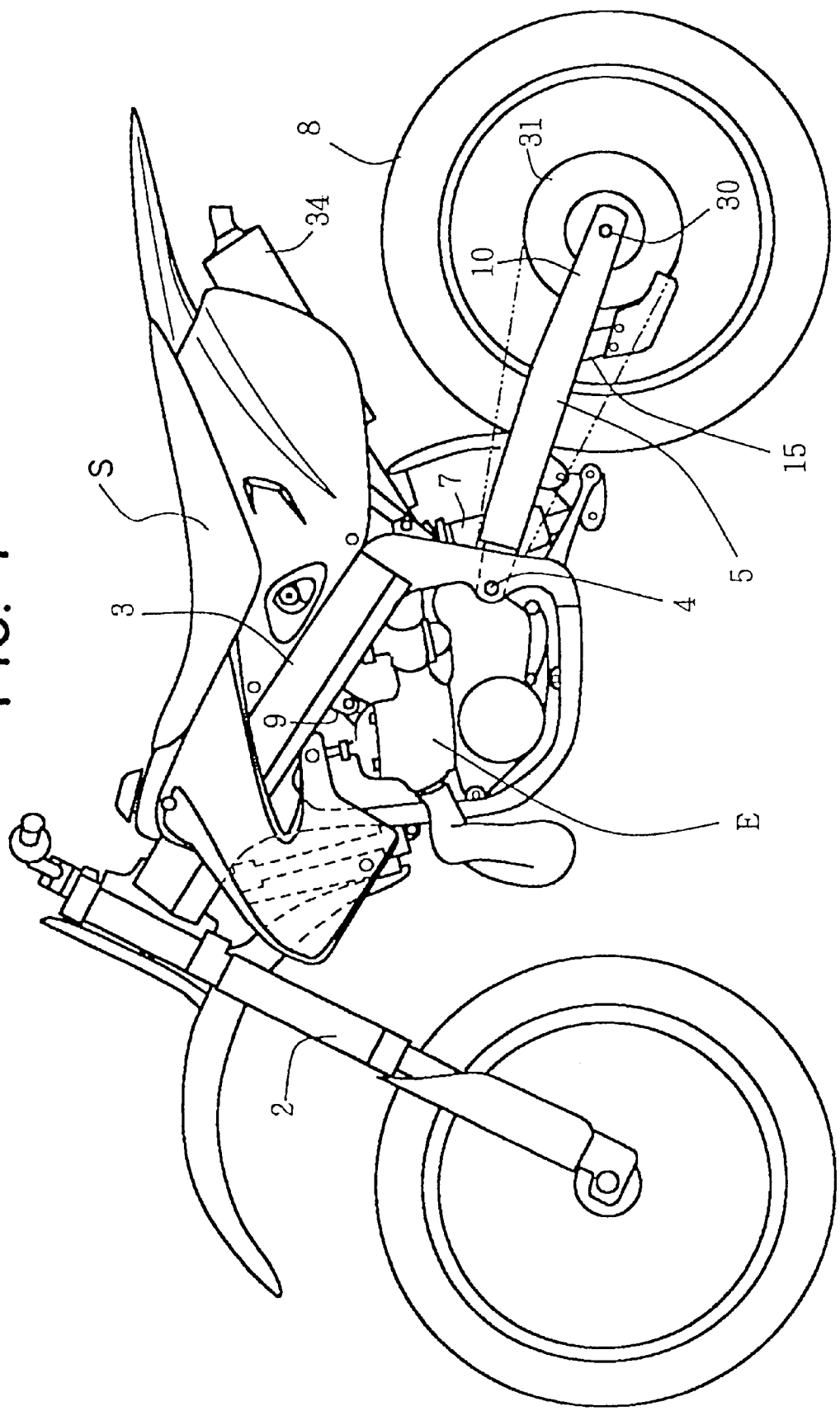
FIG. 7 is a side, elevational view showing a skeleton frame of an off-road motor-bike in a second preferred embodiment.
Figure 8:
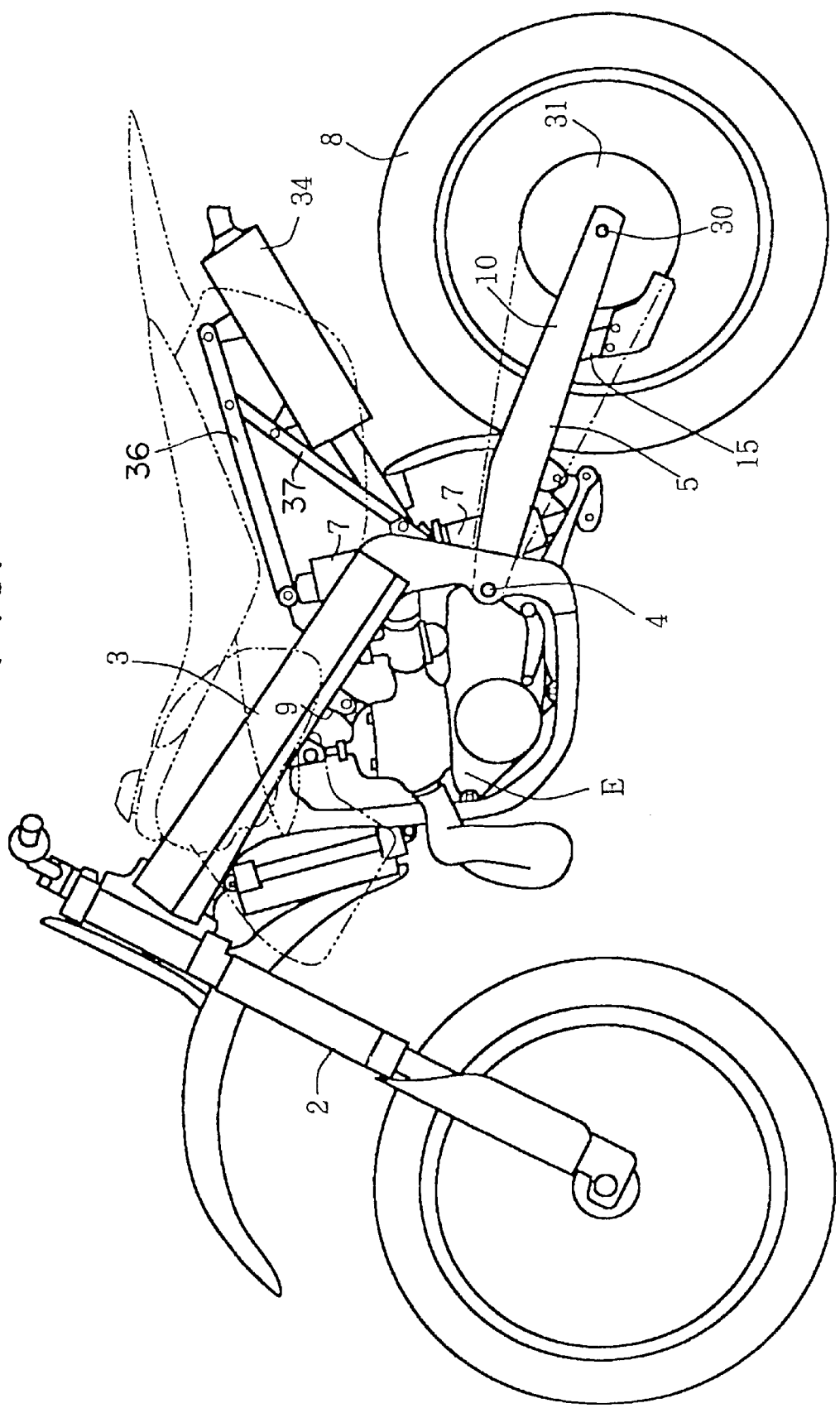
FIG. 8 is a side, elevational view similar to FIG. 7 with a portion of the motor-bike being partially broken away.
Figure 9:
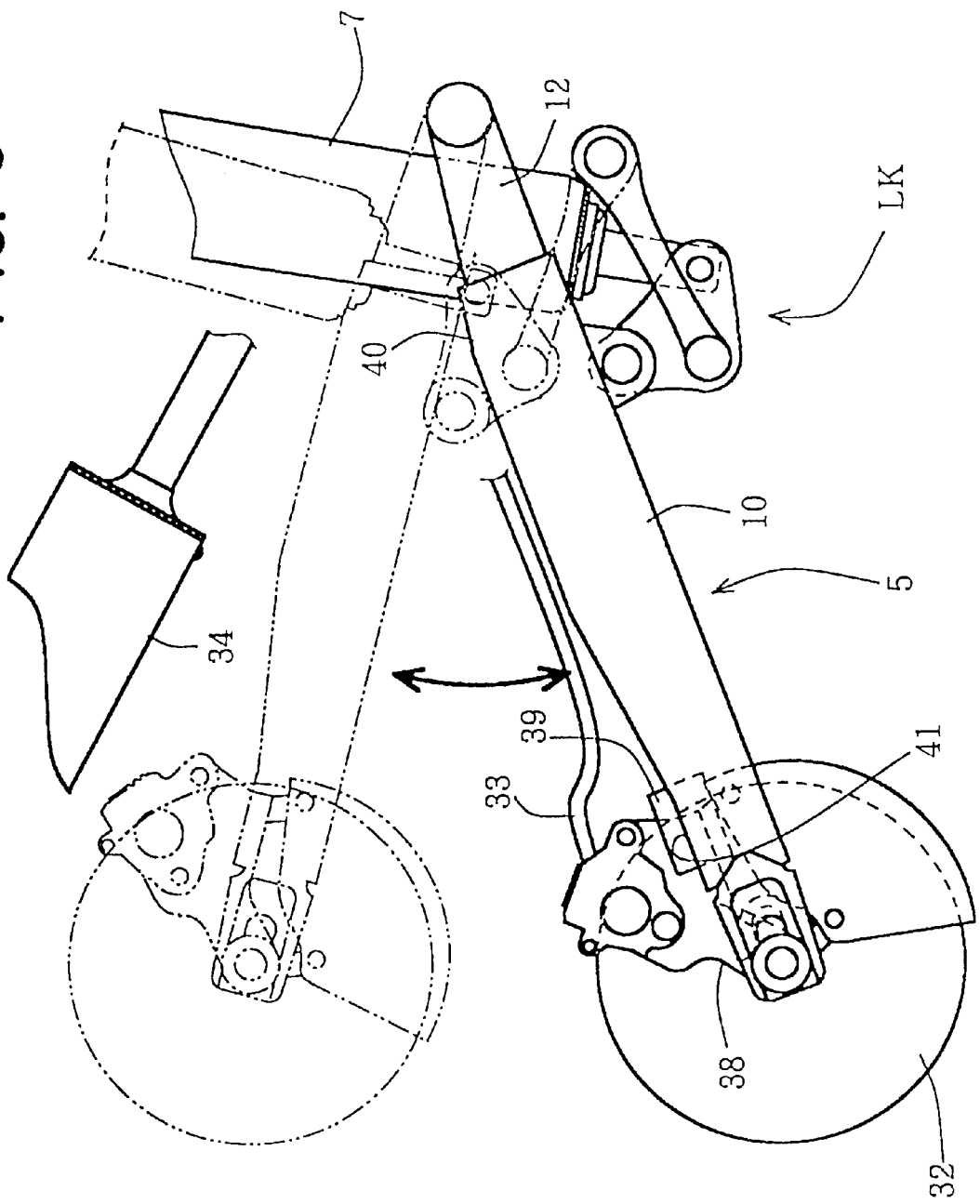
FIG. 9 is a side, elevational view showing a motion of the rear swing arm.
Figure 10:
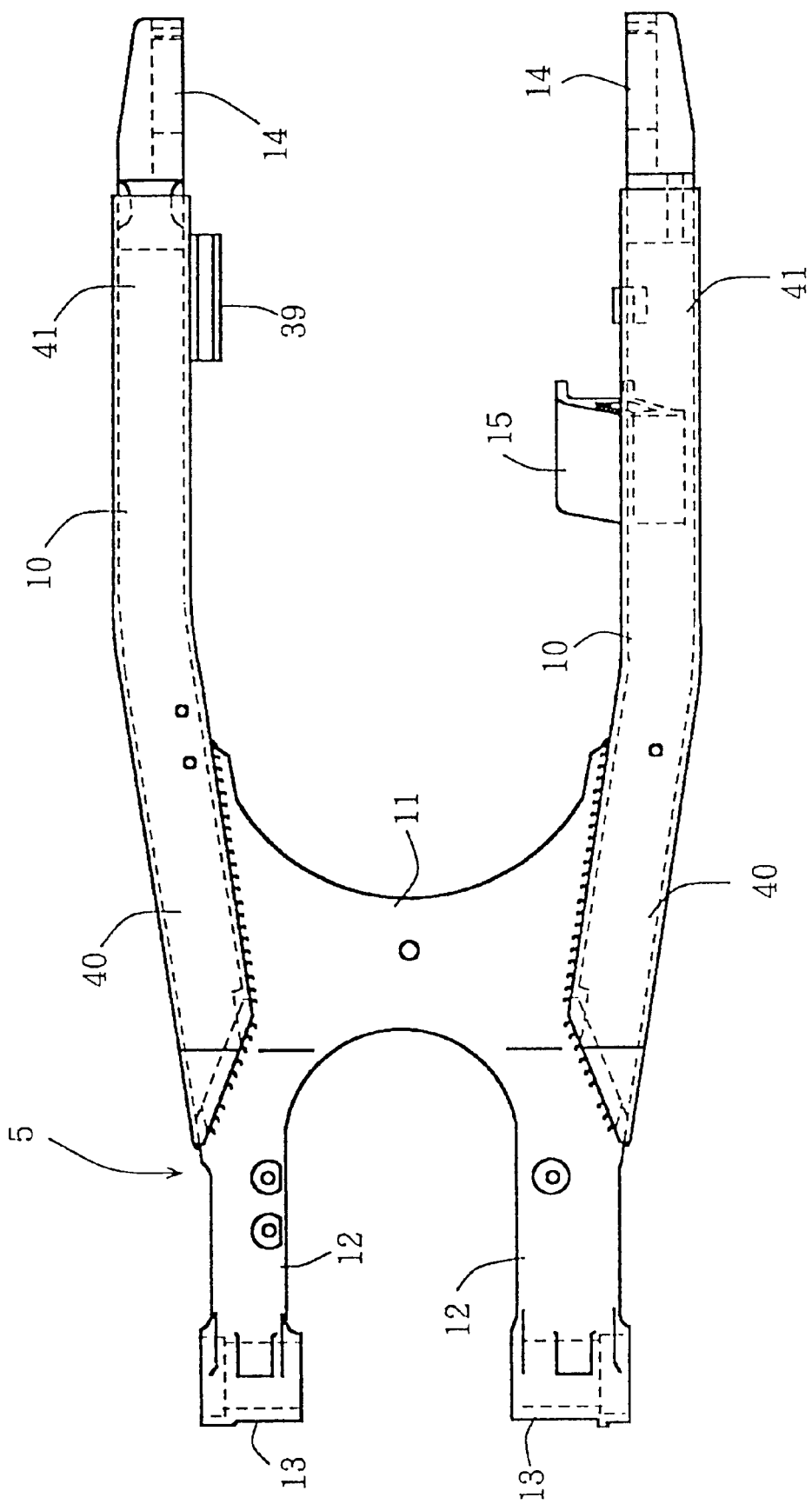
FIG. 10 is a top, plan view showing a rear swing arm.
Figure 11:
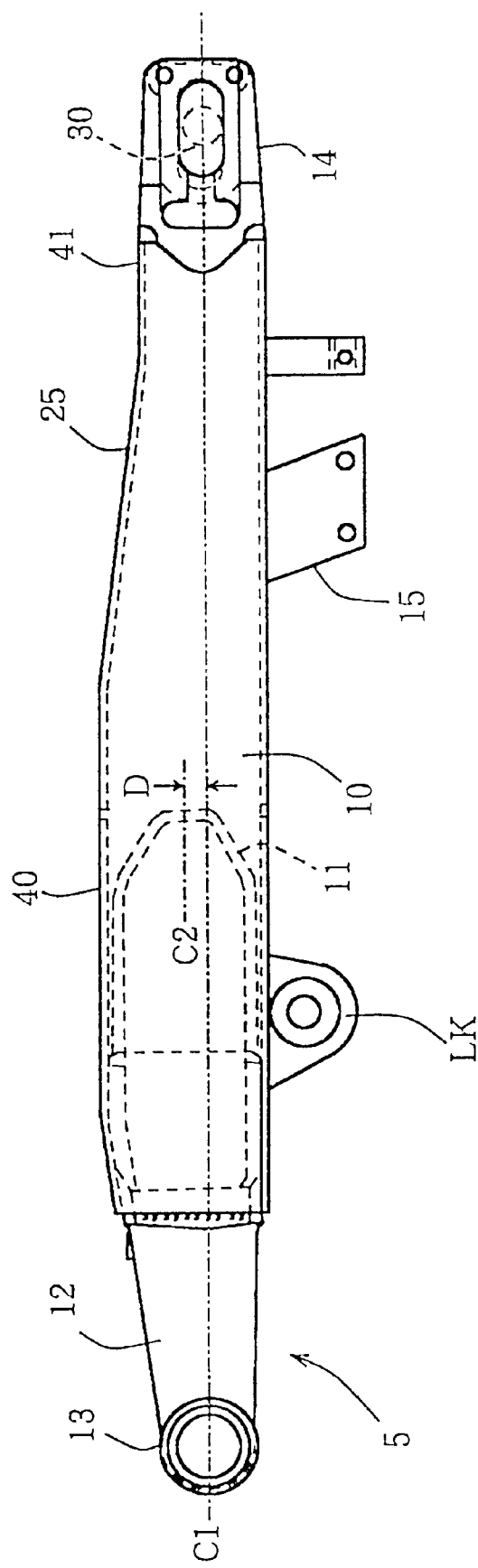
FIG. 11 is a side, elevational view showing a rear swing arm.

Referring to FIGS. 7 to 14, a second preferred embodiment will be described. FIG. 7 is a side elevational view for showing a skeleton of an off-road motor-bike in the preferred embodiment. FIG. 8 is a side, elevational view similar to FIG. 7 with a portion of the motor-bike being partially broken away. FIG. 9 is a view showing a motion of the rear swing arm 5 as viewed from an opposite side (a right side of the vehicle body), FIG. 10 is a top, plan view showing the rear swing arm 5, and FIG. 11 is a side elevational view of FIG. 10.

Figure 12A:
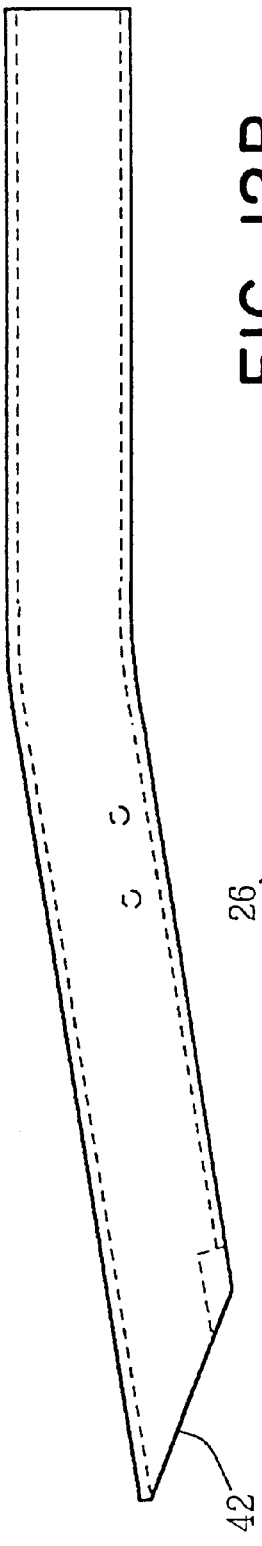
FIG. 12A is a side, elevational view showing a shape of a pipe member.
Figure 12B:
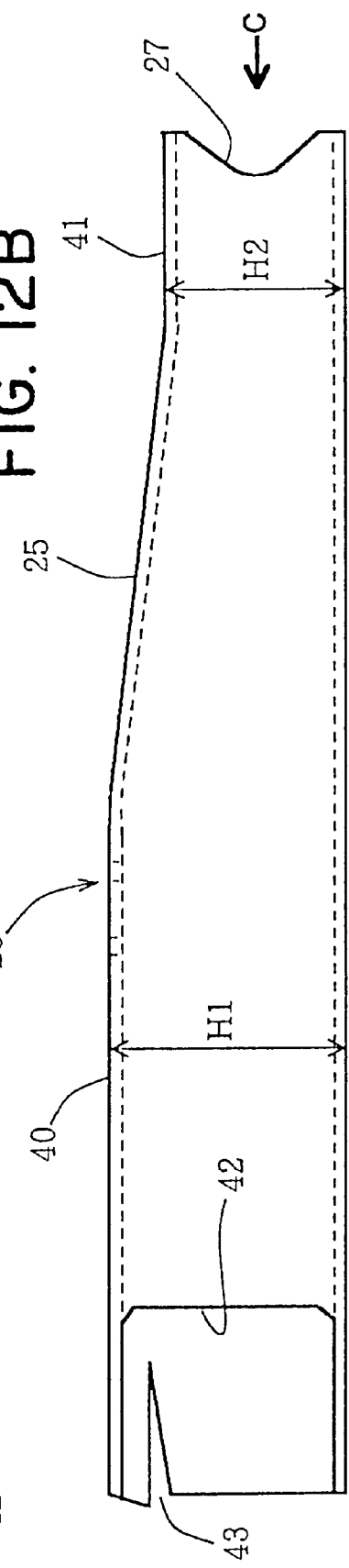
FIG. 12B is a top, plan view showing the shape of a pipe member of FIG. 12A.
Figure 12C:
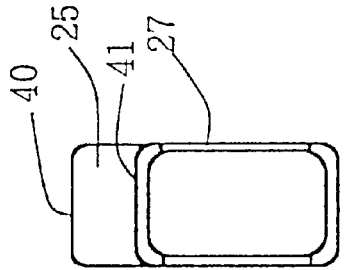
FIG. 12C is a rear view showing the shape of a pipe member of FIG. 12A.

In addition, FIGS. 12A–12C show a side elevational view, a top plan view, and an rear view, respectively, of the tapered, irregular thickness, rectangular pipe member 26. FIGS. 13A–13C and 14A–14B are views for showing a structure for fixing component elements to the side surface of the tapered, irregular thickness, pipe member 26.

In the following description, the same or similar reference numerals are applied to the structure or functional part common to those of the first preferred embodiment. Use of the same or similar reference numerals are similarly applied to the other preferred embodiments which will be discussed hereinbelow.

First, turning to FIGS. 7 and 8, a driven sprocket 31 is coaxially fixed to a rear wheel shaft 30 at the left side of the vehicle of the rear wheel 8. A brake disk 32 is fixed to the right (other) side of the vehicle as shown in FIG. 9. A brake caliper 33 is slidably in contact with the brake disk 32 and a muffler 34 is positioned above the brake caliper. The muffler 34 is connected to the exhaust chamber 35 of the engine E and supported by a seat rail 36 supporting a seat S and at a rear stay 37.

To the inner side surface of the rear part at the fork arm 10, a bracket holder 39 is fixed at the right side of the vehicle as shown in FIG. 9. The brake caliper 33 is fixed to the extremity end of the caliper bracket 38 coaxially supported with the brake disk 32 at the end piece 14 of the fork arm 10. The lower part of the caliper bracket 38 is supported by the bracket holder 39.

In addition, the muffler 34 is arranged at a limiting position for oscillation of the fork arm 10 (the bottom position of the rear suspension as shown in broken line in FIG. 9) so as to avoid interfere with the brake caliper 33. The muffler faces the upper part of the fork arm 10.

As apparent from FIGS. 10 and 11, although the rear swing arm 5 has a shape which is approximately similar to that of the first preferred embodiment, its drawing shape at the fork arm 10 is made different as shown in FIG. 11.

That is, as shown in FIG. 12A, only the upper surface of the tapered, irregular thickness, rectangular pipe member 26 constituting the fork arm 10 is drawn. This upper surface is divided into two steps having a front side 40 and a rear side 41 with the tapered part 25 being therebetween. As shown in FIG. 12B, the two sides 40 and 41 have different heights H1, H2 in a vertical direction (H1>H2).

In addition, the front end forms a slant cut part 42 directed inwardly to form a long welding line together with a side surface of the cross member part. At the side surface of the slant cut part 42, a slit 43 if formed from its front end side. An opening at the front end side is collapsed during welding operation against the cross member 11 so as to be closely contacted with the cross member 11. The front side 40 is bent inwardly at a part changing toward the tapered part 25 and its top plan view shape is in a substantial A-shape.

FIG. 12A shows a side elevational view for showing the tapered, irregular thickness, rectangular pipe member 26, FIG. 12B shows a top plan view, and FIG. 12C shows a view taken from a rear end side. This tapered, irregular thickness, rectangular pipe member 26 is formed by the same method as that of the first preferred embodiment.

As described above, a reason why the rear side 41 is lower than the front side 40 as formed by the tapered part 25 is that increased oscillation of the swing arm 10 is possible because the brake caliper 33 will not interfere with the muffler 34. In other words, the amount of stroke or movement at the rear suspension is increased as much as possible as shown in FIG. 9.

In addition, only the upper surface of the swing arm 10 is made narrow. An oscillating center line Cl of the rear swing arm connects the center of the bearing 13 to the center of the rear wheel shaft 30 as indicated in FIG. 11. Also, a pipe center line C2 passes through an intermediate height part in a vertical direction at the front side 40 of the fork arm 10. The distance between these lines C1 and C2 is only a difference D that the pipe center line C2 is offset in an upward direction.

In the present arrangement, the brake caliper 33 is arranged above the swing arm 10. The capacity of the muffler 34 would be required to be decreased if the caliper would hit the muffler during pivoting of the swing arm. In the present invention, the caliper 33 is positioned on the lowered rear part 41 to thereby avoid engagement with the muffler 34 as seen in FIG. 11. The caliper 33 is spaced from the muffler by the extra height D between the oscillating center line C1 and the pipe center line C2.

In addition, the supporting part or bracket holder 39 of the brake caliper 33 is placed at the rear part 41 of the flat part having a uniform sectional surface formed at a rear part of the tapered part 25. In the present invention, the brake caliper 33 can be efficiently arranged on this rear part 41.

In addition, the position of the suspension link LK in FIG. 11 can be mounted at a higher level than in the prior art. This results in an increased ground clearance for the suspension link LK. Due to this fact, it is possible to concurrently obtain a large ground clearance and an increased pivot distance or large stroke amount for the rear suspension.

FIGS. 13A, 13B and 13C show processing of a burr 44 generated during swagging treatment with the present manufacturing method. The burr 44 is produced at the parting part of the fork arm 10 at the surface of the fork arm 10 as shown in FIG. 13A. FIG. 13B shows the bracket holder 39 overlapping on the burr 44. A releasing part 45 having concave shape is formed on holder 39 as shown in the enlarged view of FIG. 13C.

With such an arrangement as above, it is possible to prevent a state in which the fixing surface of the bracket holder 39 is pushed away from the fork arm 10 by the burr 44 even if the treatment of the burr 44 is eliminated or simplified. Accordingly, troublesome operation required for processing the burr 44 can be remarkably reduced and manufacturing costs can be reduced well.

Figure 14A:
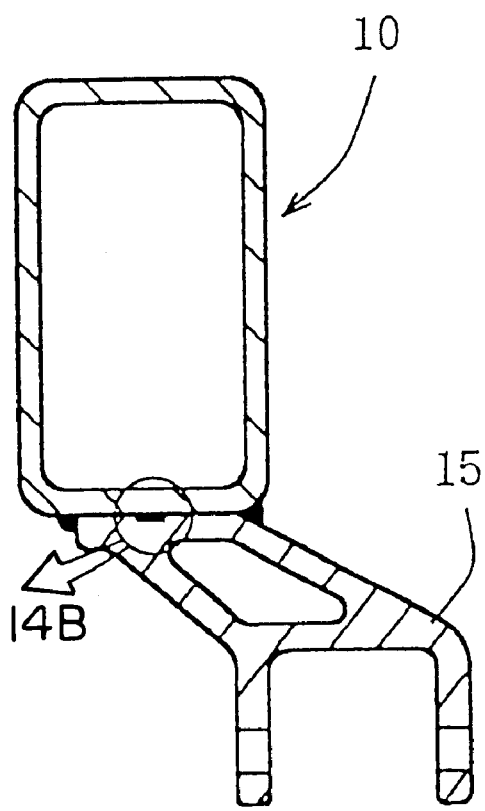
FIG. 14A is a cross-sectional view showing a burr removing treatment similar to that of FIG. 13 for another component element.
Figure 14B:
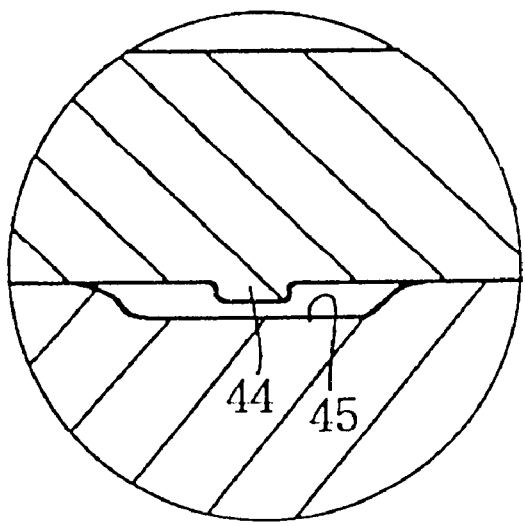
FIG. 14B is an enlarged, cross-sectional view taken in the encircled area of FIG. 14A.

FIGS. 14A and 14B show a similar structure applied to the fixing part of the chain guide stay 15. A releasing part 45 is again provided to prevent the burr 44 from pushing the fixing part of the chain guide stay away from the fork arm 10. In other works, the mating surfaces of the fixing part of the chain guide stay 15 and fork arm 10 can properly adjoin one another without interference from the burr 44.

Figure 15:
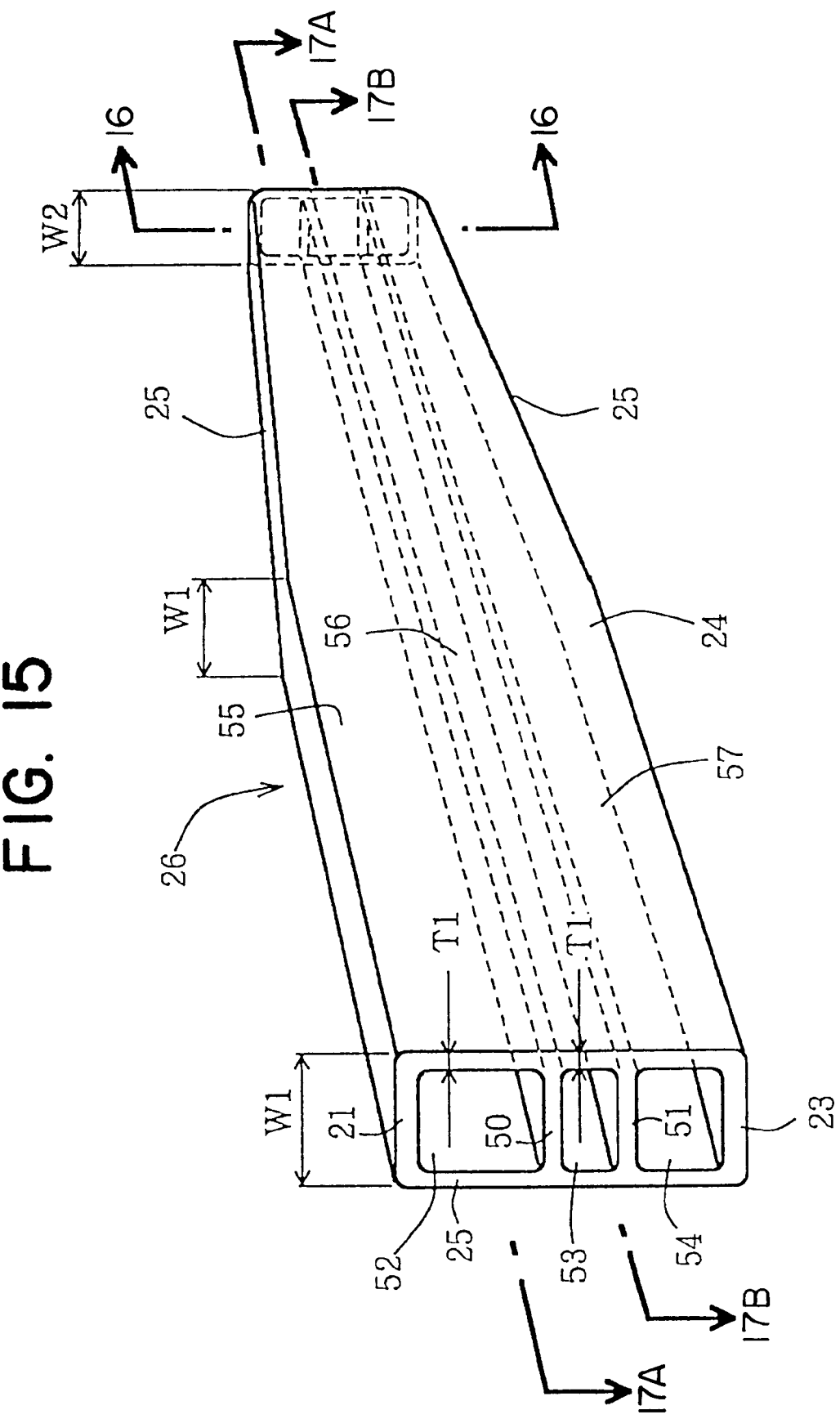
FIG. 15 is a perspective view showing a pipe member in a third preferred embodiment.
Figure 16:
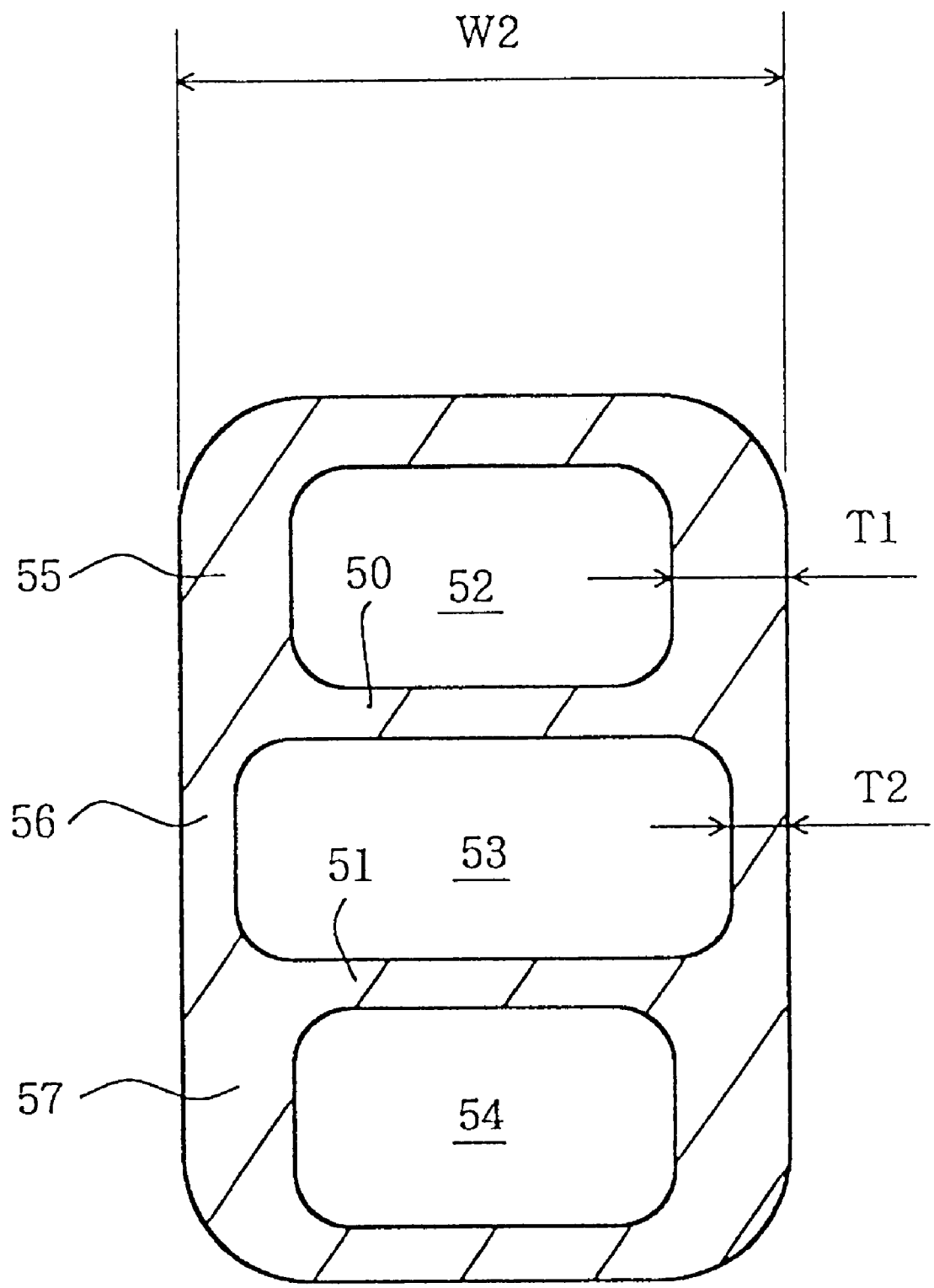
FIG. 16 is a cross-sectional view taken along line 15—15 of FIG. 15.

FIGS. 15, 16, 17A and 17B illustrate a tapered, irregular thickness, rectangular pipe member 26 in a third preferred embodiment. FIG. 15 is a perspective view taken from the front end side. FIG. 16 is a sectional view for showing a rear end part taken along a line 16—16 of FIG. 15. FIG. 17A is a sectional view taken along a line 17A—17A of FIG. 15, and FIG. 17B is a sectional view taken along a line 17B—17B of FIG. 15.

As shown in FIGS. 15 and 16, the tapered, irregular, thickness rectangular pipe 26 is formed by a swagging having non-rotary dies for a rectangular pipe having substantial double-block sections, and formed with the tapered part 25 in a substantial vertical orientation.

Prior to the formation of the tapered, irregular thickness, rectangular pipe member 26, the raw pipe member is formed with the upper and lower two staged partition walls 50, 51 in parallel with a longitudinal direction in its hollow part. The hollow part is thereby divided into an upper chamber 52, an intermediate chamber 53 and a lower chamber 54, respectively.

A width of each of the upper and lower surfaces in the tapered, irregular thickness, rectangular pipe member 26 is kept constant (W1) from its front end to its central part and gradually narrowed from the central part toward the width of the rear end (W2) (W1>W2)

A wall thickness is kept constant (T1) at each of the portions at the front end. However, the wall thickness of the side wall 56 of the intermediate chamber 53 is gradually thinned toward a rear part and the rear end becomes T2 as indicated in FIGS. 17A and 17B. In turn, since a wall thickness of each of the side walls 55, 57 in the upper chamber 52 and the lower chamber 54 is kept constant (T1), only the side wall 56 of the intermediate chamber 53 at the rear end is made thin (T2<T1).

This variation in wall thickness is formed when the tapered, irregular thickness, rectangular pipe member 26 is formed. This shows that although the tapered part 25 is extended in a longitudinal direction when the tapered part is formed, side walls 55, 57 of the upper chamber 52 and the lower chamber 54 formed in tapered form are short in their height direction, so that even if the wall thickness is not changed, the wall thickness of the extended part can be assured. However, since the side wall 56 of the intermediate chamber 53 is not changed in its height, but only its length is extended, it is necessary to assure the wall thickness corresponds to the extended portion by making the wall thickness thin.

Although the variation in wall thickness of the side wall 56 is determined in reference to a spacing between the intermediate mold and the outer mold in the swagging operation when the tapered part is formed, it is desired that a reduced width of the outer mold causing the wall thickness to be thin makes a smoother removal of the intermediate mold after formation than that of an increased width of the intermediate mold to cause the wall thickness to be thin.

In the preferred embodiment, since the metal in the side wall is difficult to move due to the presence of the partition walls 50, 51, such a variation in wall thickness enables prevention of generation of cracks at the interface between the side wall 56 and either the side wall 55 or the side wall 57 when the tapered, irregular thickness, rectangular pipe member 26 through swagging operation, resulting in that its forming characteristic is improved.

Referring now to FIGS. 18, 19, 20A and 20B a fourth preferred embodiment of the present invention will be described. Also in this preferred embodiment, the rear swing arm 5 is constructed by the tapered, irregular thickness, rectangular pipe member 26 formed in the same manner as that of the previous preferred embodiments.

However, the fork arm 10 in this preferred embodiment is different from that of the previous embodiments in view of the fact that the bearing arm 12 at the front end is integrally formed with the main body part of the fork arm 10. That is, the right and left fork arms 10 are made such that each of their front parts is set as a bearing arm 12 projecting forwardly and they are welded at their extremity ends to both ends of the pivot pipe 60.

Figure 19:
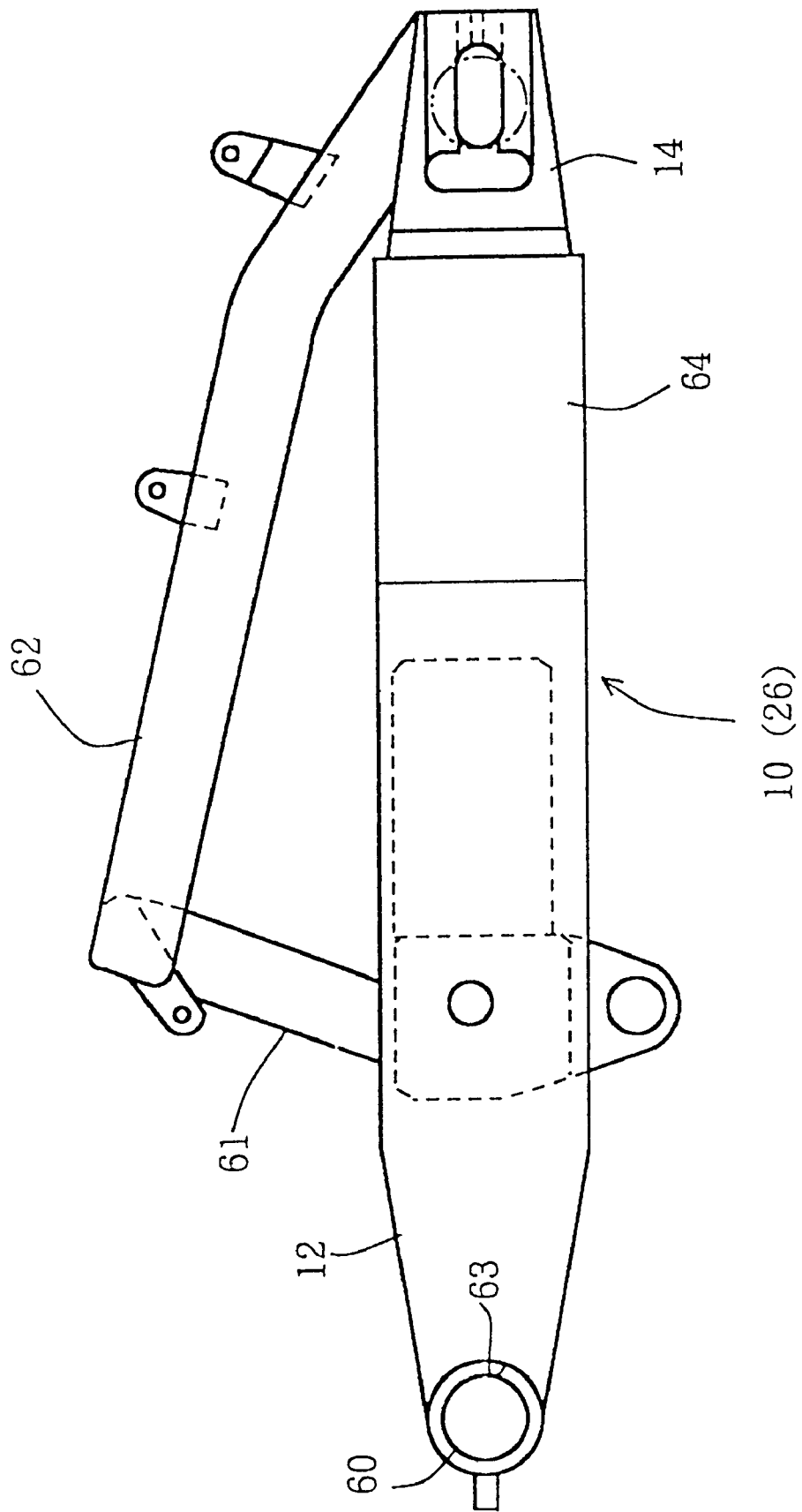
FIG. 19 is a side, elevational view of FIG. 18.

Reference numeral 61 in FIGS. 18 and 19 denotes a stay projecting upwardly from the cross member 11. A substantially U-shaped reinforcing pipe 62 is provided for connecting the upper end of the stay 61 with the right and left end pieces 14. The fork arm 10 is constructed such that, as its tapered, irregular thickness, rectangular pipe member 26 being also shown in FIGS. 20A and 20B, its front end is made as a tapered part 25, thereby the bearing arm 12 is formed and its extremity end is formed with an arcuate concave part 63 abutted against an outer circumference of the pivot pipe 60.

A rear part 64 of the tapered, irregular thickness, rectangular pipe member 26 is formed straight and the end piece 14 is fitted and then is welded to it. In this case, although the rear part 64 has a large opening for use in loading or unloading a core when the tapered, irregular thickness, rectangular pipe member 26 is formed, it can be accommodated by increasing a size of the fitted part of the end piece 14. In this way, the tapered, irregular thickness, rectangular pipe member 26 is formed with the tapered part 25 at the other side in order to load or unload the core from either one of the front or rear side. Accordingly, if the front side is made to be narrowed, the bearing arm 12 can be easily and integrally formed.

Figure 21A:
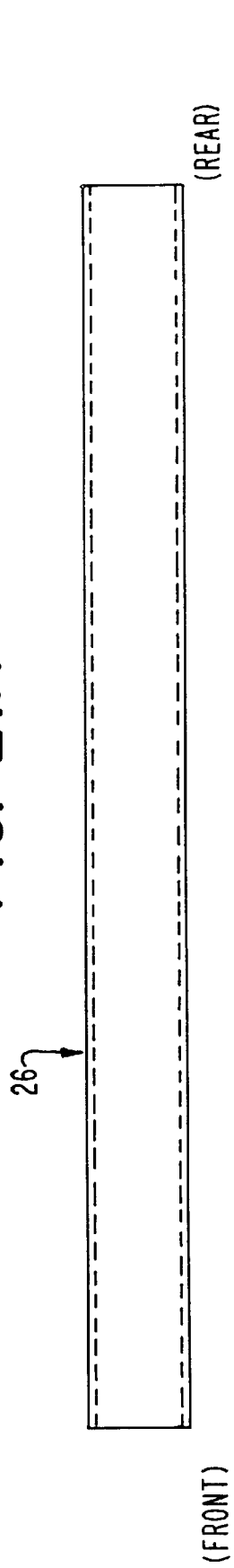
FIG. 21A is a top, plan view showing a pipe member in a fifth preferred embodiment.
Figure 21B:
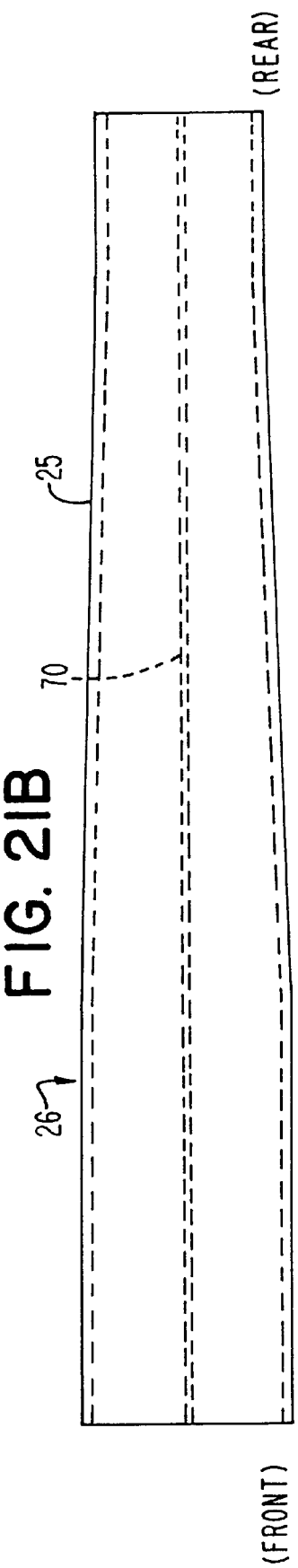
FIG. 21B is a side, elevational view of the pipe member of the fifth embodiment of FIG. 21A.
Figure 21D:
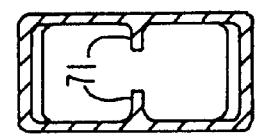
FIG. 21D is a front, end view of a modified form of the pipe member of the fifth embodiment of FIG. 21A.
Figure 21C:
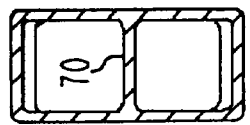
FIG. 21C is a front, end view of the pipe member of the fifth embodiment of FIG. 21A.

FIGS. 21A–21D show a fifth preferred embodiment in which the tapered, irregular thickness, rectangular pipe member 26 is formed into a double-block section. FIG. 21A shows a top plan view, FIG. 21B shows a side surface shape, FIG. 21C shows a front end shape and FIG. 21D shows a front, end view of a modified form of the pipe member.

An interior part of the hollow segment can be optionally divided and the rib 71 can be attained as shown in a modified shape in FIG. 21D in place of the side wall 70 shown in FIG. 21C. In addition, a position or number of the partition wall 70 and the rib 71 can be optionally set and they may be arranged in a vertical direction. Unlike the present invention, this cannot be attained by a forming method in which the prior art cylindrical pipe is tapered by a rotary swagging and further this is changed into a rectangular pipe.

Figure 22:
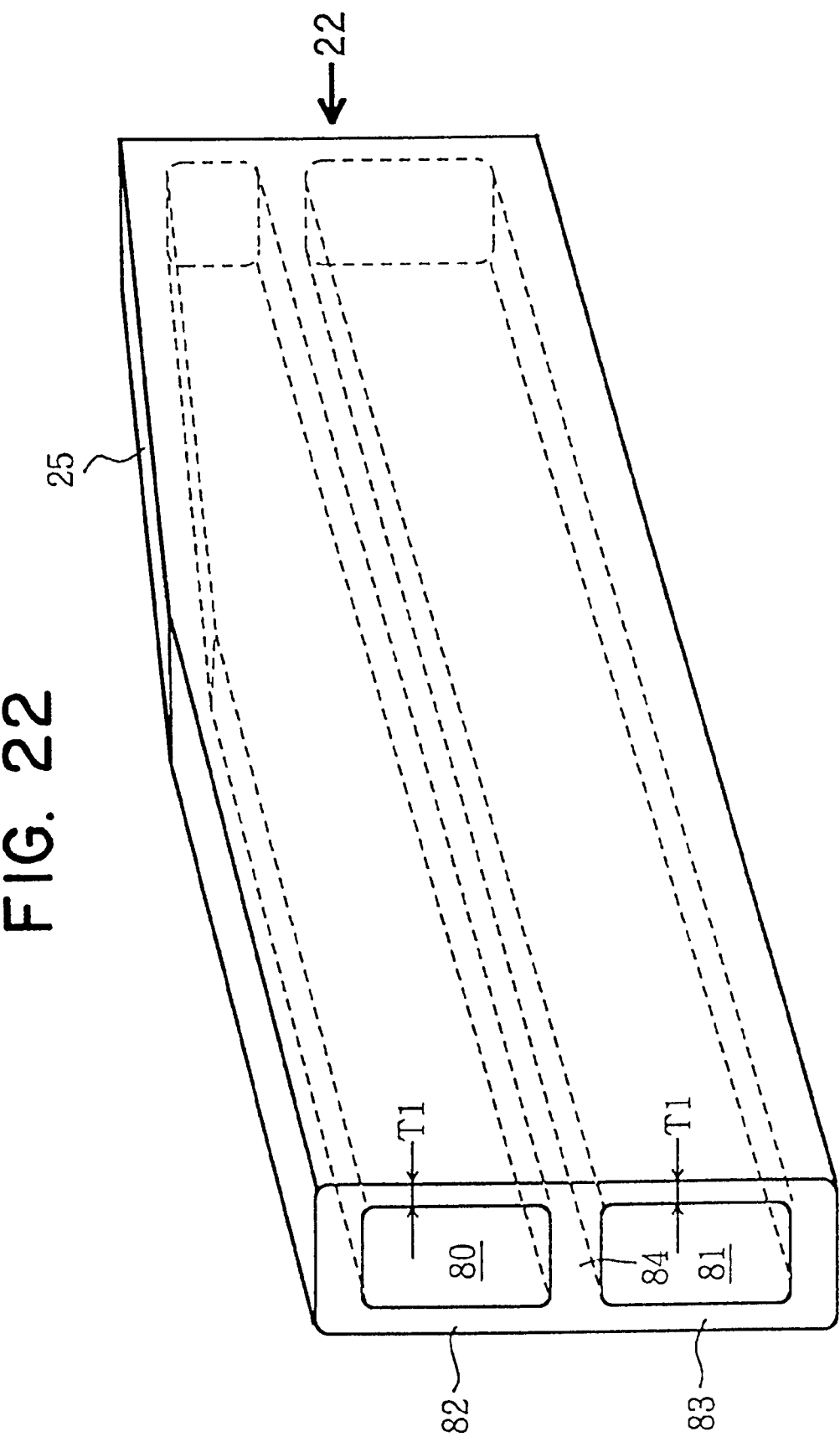
FIG. 22 is a perspective view showing the pipe member in the fifth preferred embodiment.
Figure 23:
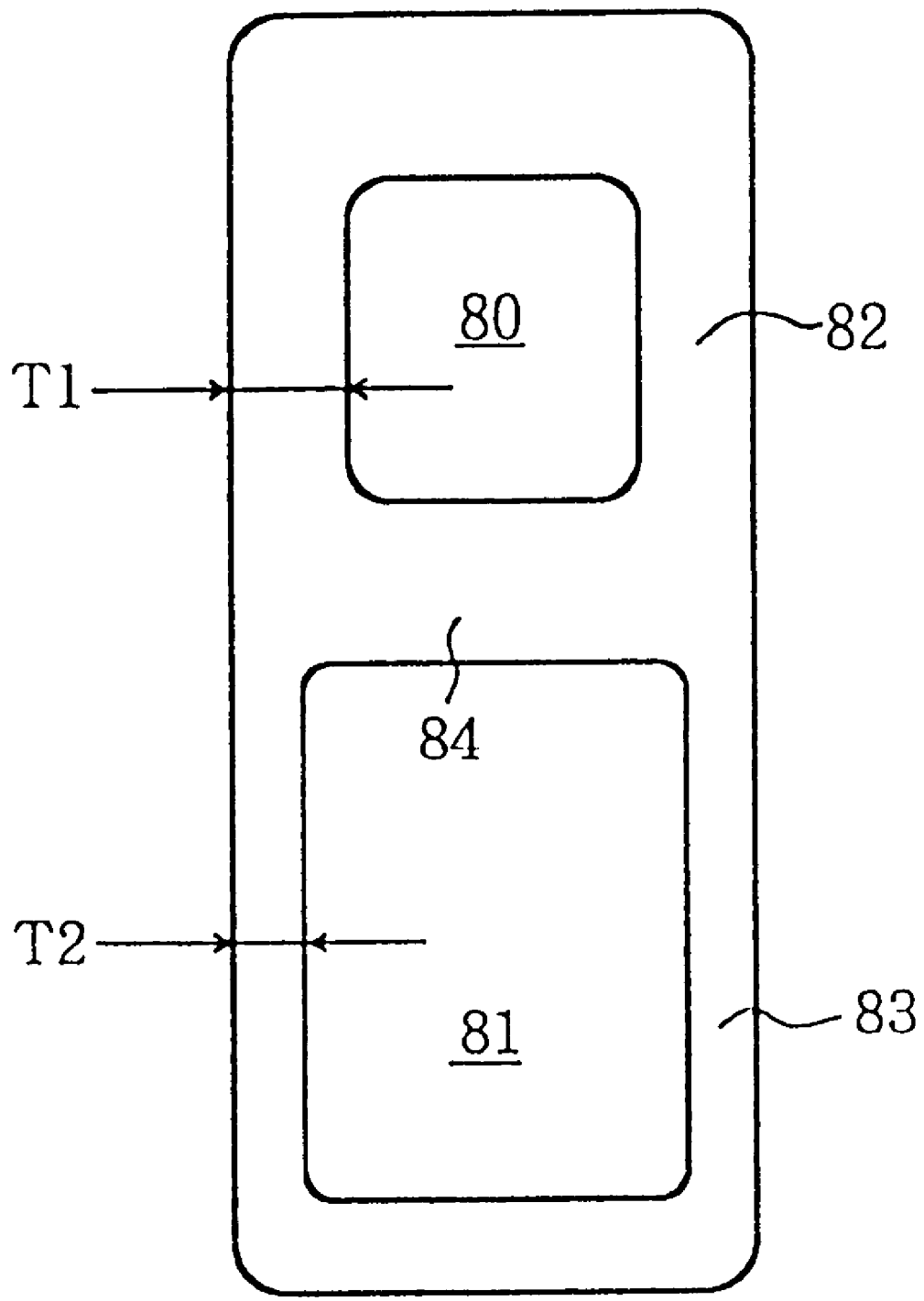
FIG. 23 is a rear, end view of FIG. 22.

FIGS. 22 and 23 illustrate a sixth preferred embodiment in which a tapered part 25 is formed only at the upper rear part of the upper chamber 80 of the tapered, irregular thickness, rectangular pipe member 26. FIG. 22 is a perspective view of the preferred embodiment and FIG. 23 is a rear view as seen from a direction of arrow 22 in FIG. 22.

Also in this preferred embodiment, the wall thickness of the side wall 82 of the upper chamber 80 and the wall thickness of the side wall 83 of the lower chamber 81 are the same value of T1 at the front end in the same manner as that of the third preferred embodiment. At the rear end, the wall thickness T2 of the side wall 83 of the lower chamber 81 not formed with the tapered part 25 is set to be thinner than the wall thickness T1 of the side wall 82 of the upper chamber 80 formed with the tapered part 25.

With such an arrangement as above, it is possible to prevent a crack from being generated when the tapered, irregular thickness, rectangular pipe member 26 by a swagging operation under the presence of the partition wall 84. The tapered, irregular thickness, rectangular pipe member 26 having a double block section and having different wall thicknesses of the side wall enclosing the upper chamber and the lower chamber can be easily formed. At this time, the fact that a width of the outer mold is made small to cause the wall thickness of the side wall 83 to be thin is preferable in view of making a smooth removal of the intermediate mold after forming operation similarly to that of the third preferred embodiment.

In addition, the application of the present invention is not limited to the rear swing arm 5, but can be applied to each of the frames of another vehicle. For example, in FIG. 3, the formed member may be applied to any location such as the main frame 3, the stay 6 and the engine hanger 9 or the like where the tapered, irregular thickness, rectangular pipe member is required. In addition, as the method for forming used in the second step, a roll forging or forging with inner and outer dies can be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A rear swing arm for a motor-bike comprising a rectangular pipe, the rectangular pipe having a front end which is pivotally supportable to a vehicle body and a rear end on which a rear wheel at a rear wheel supporting part is supportable, the rectangular pipe being tapered at least partially in a longitudinal direction and having sectional surfaces which are generally perpendicular to the longitudinal direction, the rectangular pipe having a longitudinal rectangular shape formed by upper, lower, left-side and right-side walls, at least a portion of one of the upper, lower, left-side and right-side walls having an irregular thickness which is thicker than that of other walls and one longitudinal end of the rectangular pipe being thinner than the other end, the lower side wall of the tapered rectangular pipe being substantially straight and the upper side wall being tapered, a rear part of the upper wall being tapered such that the rectangular pipe is narrowed to form a rear wheel supporting part and to accommodate a brake caliper arranged thereabove, at least one partition wall dividing an interior of the rectangular pipe into at least two chambers, each of the at least two chambers having side walls and one of the chambers having a tapered wall surface and one of the chambers being without a tapered wall surface, a side wall of the one chamber without a tapered wall surface being thinner than a side wall of a chamber having a tapered wall surface.

2. The rear swing arm for a motor-bike as set forth in claim 1, further comprising another component which is welded to the rectangular pipe and one of the another component and the rectangular pipe having means for receiving burrs formed when the another component element is fixed to a surface of the tapered rectangular pipe, the means for receiving comprises a recess which overlaps with the burrs.

3. The rear swing arm for a motor-bike as set forth in claim 1, wherein two chambers are provided as the at least two chambers within the rectangular pipe with a first one of the two chambers having the tapered wall surface and a second one of the two chambers being without the tapered wall surface, the side wall of the second chamber being thinner than the side wall of the first chamber.

4. The rear swing arm for a motor-bike as set forth in claim 1, wherein three chambers are provided as the at least two chambers within the rectangular pipe with a first and third one of the three chambers having the tapered wall surfaces and with a second one of the three chambers being without the tapered wall surface, the side wall of the second chamber being thinner than the side wall of the first and third chambers.

5. The rear swing arm for a motor-bike as set forth in claim 1, wherein two chambers are provided as the at least two chambers within the rectangular pipe with a first one of the two chambers having the tapered wall surface and a second one of the two chambers being without the tapered wall surface, the side wall of the second chamber being thinner than the side wall of the first chamber.

6. The rear swing arm for a motor-bike as set forth in claim 1, wherein three chambers are provided as the at least two chambers within the rectangular pipe with a first and third one of the three chambers having the tapered wall surfaces and with a second one of the three chambers being without the tapered surface, the side wall of the second chamber being thinner than the side wall of the first and third chambers.

7. A rear swing arm for a motor-bike comprising a rectangular pipe, the rectangular pipe having a front end which is pivotally supportable to a vehicle body and a rear end on which a rear wheel at a rear wheel supporting part is supportable, the rectangular pipe being tapered at least partially in a longitudinal direction and having sectional surfaces which are generally perpendicular to the longitudinal direction, the rectangular pipe having a longitudinal rectangular shape formed by upper, lower, left-side and right-side walls, at least a portion of one of the upper, lower, left-side and right-side walls having an irregular thickness which is thicker than that of other walls and one longitudinal end of the rectangular pipe being thinner than the other end, a forward end of the rectangular pipe being tapered and a bearing member connectable to a vehicle body being fixed to an extremity end of the tapered part, at least one partition wall dividing an interior of the rectangular pipe into at least two chamber, each of the at least two chambers having side walls and one of the chambers having a tapered wall surface and one of the chambers being without a tapered wall surface, a side wall of the one chamber without a tapered wall surface being thinner than a side wall of a chamber having a tapered wall surface.

8. The rear swing arm for a motor-bike as set forth in claim 7, further comprising another component which is welded to the rectangular pipe and one of the another component and the rectangular pipe having means for receiving burrs formed when the another component element is fixed to a surface of the tapered rectangular pipe, the means for receiving comprises a recess which overlaps with the burrs.

* * * * *